US009409591B2

(12) United States Patent
Johta et al.

(10) Patent No.: US 9,409,591 B2
(45) Date of Patent: Aug. 9, 2016

(54) STEERING DEVICE

(71) Applicant: NSK Ltd., Shinagawa-ku, Tokyo (JP)

(72) Inventors: Masaya Johta, Gunma (JP); Hideki Kojima, Gunma (JP); Wataru Hagiwara, Gunma (JP); Daiki Orihara, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 14/758,431

(22) PCT Filed: Oct. 17, 2014

(86) PCT No.: PCT/JP2014/077732
§ 371 (c)(1),
(2) Date: Jun. 29, 2015

(87) PCT Pub. No.: WO2015/064396
PCT Pub. Date: May 7, 2015

(65) Prior Publication Data
US 2015/0353123 A1 Dec. 10, 2015

(30) Foreign Application Priority Data

Oct. 30, 2013 (JP) ................. 2013-225851
Nov. 28, 2013 (JP) ................. 2013-246718
Jan. 7, 2014 (JP) ................. 2014-000992

(51) Int. Cl.
B62D 1/19 (2006.01)
B62D 1/187 (2006.01)
(52) U.S. Cl.
CPC ............ *B62D 1/195* (2013.01); *B62D 1/187* (2013.01)
(58) Field of Classification Search
CPC .................. B62D 1/195; B62D 1/187
See application file for complete search history.

(56) References Cited

U.S. PATENT DOCUMENTS 5,722,299 A 3/1998 Yamamoto et al.
8,555,745 B2 10/2013 Inoue
(Continued)

FOREIGN PATENT DOCUMENTS

JP 08-099640 A 4/1996
JP 2006-160242 A 6/2006
(Continued)

OTHER PUBLICATIONS

International Search Report for PCT/JP2014/077732 dated Jan. 20, 2015 [PCT/ISA/210].
(Continued)

*Primary Examiner* — Faye M Fleming
(74) *Attorney, Agent, or Firm* — Sughrue Mion, PLLC

(57) ABSTRACT

A steering device which slides when an impulse load is applied. A steering device includes an inner column having a cylindrical shape, an outer column into which at least a part of the inner column is inserted, a column bracket tightening the outer column, a pressed portion provided on the outer periphery of the inner column, a first tightening mechanism tightening the outer column in response to a rotation of a manipulation lever, a second tightening mechanism biasing a lock member to the pressed portion in a tilt direction in response to the rotation of the manipulation lever, and a separation mechanism. The separation mechanism causes the inner column detachable by changing a relative position between the inner column and the pressing bracket, when the impulse load is applied in a state where the first tightening mechanism and the second tightening mechanism are in work.

12 Claims, 23 Drawing Sheets

(56) References Cited

U.S. PATENT DOCUMENTS

| | | | | |
|---|---|---|---|---|
| 2012/0125139 | A1* | 5/2012 | Tinnin | B62D 1/195 74/493 |
| 2012/0318092 | A1* | 12/2012 | Kuroumaru | B62D 1/195 74/492 |
| 2014/0026707 | A1* | 1/2014 | Yokota | B62D 1/184 74/493 |
| 2014/0144277 | A1* | 5/2014 | Kakishita | B62D 1/187 74/493 |
| 2015/0266499 | A1* | 9/2015 | Yoshihara | B62D 1/195 74/493 |

FOREIGN PATENT DOCUMENTS

| | | |
|---|---|---|
| JP | 2007-069800 A | 3/2007 |
| JP | 2009-029152 A | 2/2009 |
| JP | 2011-046310 A | 3/2011 |
| WO | 2010/122958 A1 | 10/2010 |

OTHER PUBLICATIONS

Written Opinion for PCT/JP2014/077732 dated Jan. 20, 2015 [PCT/ISA/237].

* cited by examiner

STEERING DEVICE

CROSS REFERENCE TO RELATED APPLICATIONS

This application is a National Stage of International Application No. PCT/JP2014/077732 filed Oct. 17, 2014, claiming priorities based on Japanese Patent Application Nos. 2013-225851 filed Oct. 30, 2013, 2013-246718 filed Nov. 28, 2013, 2014-000992 filed Jan. 7, 2014, the contents of all of which are incorporated herein by reference in their entirety.

BACKGROUND OF THE INVENTION

1. Field of the Invention

The present invention relates to a steering device.

2. Description of the Related Art

As a structure for supporting a steering device that gives a rudder angle to a vehicle wheel with the rotation of a steering wheel, a technique using a capsule is widely known. For example, in a technique disclosed in Prior Art 1, when an excessive load is applied to a steering column attached to a vehicle body through a capsule so that the steering column is pressed toward the front side of the vehicle body, a part of the capsule is cut so that the steering column moves toward the front side of the vehicle body, and hence a driver (an operator) is protected from the upthrust (secondary collision) of the steering wheel. Meanwhile, Prior Art 2 discloses a structure in which a telescopic fixed member slides due to an impact load. In this structure, since the fixed member is inserted into a groove, there is a need to lengthen the groove in order to take a large contract amount. As a result, there is a tendency that the column increases in size.

PRIOR ART

Prior Art 1: Japanese Laid-open Patent Publication No. 2007-69800

Prior Art 2: Japanese Laid-open Patent Publication No. 2009-29152

As in the technique disclosed in Prior Art 1 in which the steering column is attached to the vehicle body through the capsule, the steering column is dropped when the capsule is cut. For this reason, when a setting value for a separation load in which the steering column moves toward the front side of the vehicle body is decreased in order to protect an operator having a light weight from the secondary collision, the steering column easily is dropped due to an erroneous operation. When the steering column is dropped due to the erroneous operation, it is difficult to perform the steering operation later. For this reason, it is difficult to decrease the setting value for the separation load.

The invention is made in view of the above-described circumstances, and an object of the invention is to provide a steering device capable of suppressing a problem in which a steering column is dropped by an erroneous operation even when a setting value of a separation load in which the steering column moves toward the front side of a vehicle body is decreased.

SUMMARY OF THE INVENTION

It is an object of the present invention to at least partially solve the problems in the conventional technology. According to an aspect of the invention, a steering device includes an inner column having a cylindrical shape and rotatably supporting an input shaft connected to a steering wheel; an outer column having a cylindrical shape into which at least a part of the inner column is inserted, and having a slit formed by notching one end thereof at which the inner column is inserted; a column bracket fixed to a vehicle body side member and tightening the outer column by a pressing bracket squeezing the outer column; a pressed portion provided on the outer periphery of the inner column; a first tightening mechanism tightening the outer column in response to a rotation of a manipulation lever; a second tightening mechanism biasing a lock member to the pressed portion in a tilt direction in response to the rotation of the manipulation lever; and a separation mechanism causing the inner column to be detachable when the inner column changes a relative position with respect to the pressing bracket, in a state where the first tightening mechanism tightens the outer column and the second tightening mechanism biases the lock member to the pressed portion in the tilt direction.

With this structure, the outer column is supported by the vehicle body through the vehicle body side member. Then, when a force is transmitted from the steering wheel to the steering column in the event of a secondary collision, the inner column is inserted into the outer column so as to be accommodated in the outer column. In this case, the outer column is fixed to the vehicle body. For this reason, even when the inner column is inserted into the outer column by an erroneous operation, the steering column does not drop. Thus, even when a squeezing pressure caused by the column bracket is decreased to reduce a friction force generated between the inner column and the outer column, the second tightening mechanism biases the lock member to the fixed plate portion in the tilt direction. This may reduce the possibility that a load caused by a factor other than the secondary collision exceeds the separation load. For this reason, in order to reduce an impact of the secondary collision for the operator having a light weight, the setting value of the separation load, in which the steering wheel moves toward the front side of the vehicle body, may be decreased.

The pressed portion is a fixed plate portion which is detachably fixed to the inner column, and at least a part of the pressed portion is disposed inside the slit of the outer column.

When the weight of the operator is light, the setting value of the separation load, in which the inner column of the steering column moves toward the front side of the vehicle body, may be decreased. In this case, a friction force generated between the inner column and the outer column is decreased by reducing a squeezing pressure caused by the column bracket. When a collision (a primary collision) occurs in the vehicle body, the fixed plate portion may be separated from the inner column. For this reason, when a collision (a primary collision) occurs in the vehicle body, the inner column is separated from the column bracket, and hence the connection of the second tightening mechanism may be released. Thus, the steering device may reduce an impact (a secondary collision) for an operator having a light weight.

The separation mechanism includes a first hole on the fixed plate portion, a second hole on the inner column, and a shear pin provided so as to straddle the first hole and the second hole, and detachably fixes the inner column and the fixed plate portion. With this structure, when a load is applied to the steering column attached to the vehicle body by the primary collision, a shearing force is applied to the shear pin when the steering column is pressed toward the front side of the vehicle body. When the shear pin is broken, the connection between the fixed plate portion and the inner column is released, and hence the connection of the second tightening mechanism is released. For this reason, a force in which the second tightening mechanism biases the lock member to the fixed plate portion in the tilt direction is not transmitted.

The steering device further includes a tilt bolt that penetrates the pressing bracket and is interlocked with the manipulation lever. The second tightening mechanism includes a rotation cam portion that is provided at a position facing the slit of the outer column and rotates along with the tilt bolt. With this structure, the operation of the first tightening mechanism may be interlocked with the operation of the second tightening mechanism. Then, the operator may adjust the tilt position and the telescopic position by releasing the fixing operations of both the first tightening mechanism and the second tightening mechanism only by the manipulation of the manipulation lever. Further, the operator may fix the tilt position and the telescopic position by fixing the first tightening mechanism and the second tightening mechanism only by the manipulation of the manipulation lever.

The relative position of the lock member in the tilt direction with respect to the fixed plate portion changes in response to the rotation of the rotation cam portion. For this reason, the operator may adjust the tilt position and the telescopic position by releasing the fixing operation of the second tightening mechanism only by the manipulation of the manipulation lever. Further, the operator may fix the tilt position and the telescopic position by fixing the second tightening mechanism only by the manipulation of the manipulation lever.

The lock member includes a tooth portion or uneven portion in a portion contacting the fixed plate portion. Accordingly, the second tightening mechanism is biased to the column bracket in the tilt direction, and is reliably fixed to the fixed plate portion in the telescopic direction.

The lock member includes a first lock member and a second lock member that are divided in the tilt direction, and wherein the separation mechanism detachably fixes the second lock member to the first lock member contacting the pressed portion.

When the weight of the operator is light, the setting value of the separation load, in which the inner column of the steering column moves toward the front side of the vehicle body, may be decreased. In this case, a friction force generated between the inner column and the outer column is decreased by reducing a squeezing pressure caused by the column bracket. When a collision (a primary collision) occurs in the vehicle body, the first lock member and the second lock member may be separated. For this reason, when a collision (a primary collision) occurs in the vehicle body, the inner column is separated from the column bracket, and hence the connection of the second tightening mechanism may be released. Thus, the steering device may reduce an impact (a secondary collision) for an operator having a light weight.

The separation mechanism includes a first hole on the first lock member, a second hole on the second lock member, and a shear pin provided so as to straddle the first hole and the second hole, and detachably fixes the first lock member and the second lock member. With this structure, when a load is applied to the steering column attached to the vehicle body by the primary collision, a shearing force is applied to the shear pin when the steering column is pressed toward the front side of the vehicle body. When the shear pin is broken, the connection between the fixed plate portion and the inner column is released, and hence the connection of the second tightening mechanism is released. For this reason, a force in which the second tightening mechanism biases the lock member to the fixed plate portion in the tilt direction is not transmitted.

The steering device further includes a tilt bolt that penetrates the pressing bracket and is interlocked with the manipulation lever. The second tightening mechanism includes a rotation cam portion that is provided at a position facing the slit of the outer column and rotates along with the tilt bolt, and the relative position of the second lock member in the tilt direction with respect to the fixed plate portion changes in response to the rotation of the rotation cam portion. With this structure, the operation of the first tightening mechanism may be interlocked with the operation of the second tightening mechanism. Then, the operator may adjust the tilt position and the telescopic position by releasing the fixing operations of both the first tightening mechanism and the second tightening mechanism only by the manipulation of the manipulation lever. Further, the operator may fix the tilt position and the telescopic position by fixing the first tightening mechanism and the second tightening mechanism only by the manipulation of the manipulation lever.

The first lock member includes a tooth portion or a concave or convex shape in a portion contacting the pressed portion. Accordingly, the second tightening mechanism is biased to the column bracket in the tilt direction, and is reliably fixed to the fixed plate portion in the telescopic direction.

The rotation cam portion is eccentric with respect to the axis of the tilt bolt. Accordingly, the second tightening mechanism is biased to the column bracket in the tilt direction, and is reliably fixed to the fixed plate portion in the telescopic direction.

The outer column is located at the front side of the vehicle body, includes a pivot bracket, and is constituted so that the separated inner column is inserted thereinto. With this structure, even when the inner column is inserted into the outer column by an erroneous operation, the steering column does not drop.

According to the invention, it is possible to provide a steering device capable of suppressing a problem in which a steering column is dropped by an erroneous operation even when a setting value of a separation load in which the steering column moves toward the front side of a vehicle body is decreased.

DETAILED DESCRIPTION OF THE PREFERRED EMBODIMENT

Figure 1:
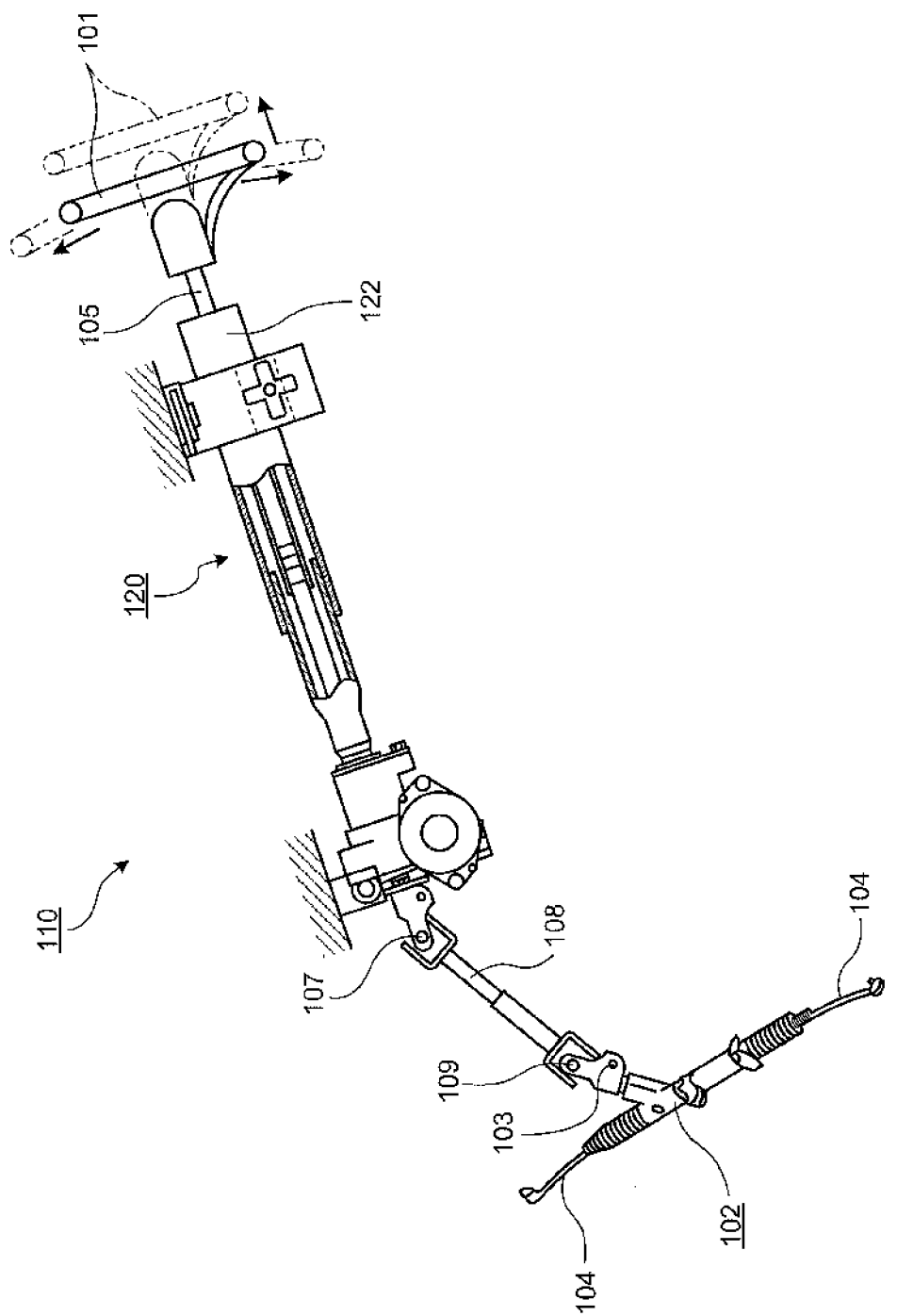
FIG. 1 is a schematic diagram illustrating an entire steering device of first to fourth embodiments.

A mode (an embodiment) for carrying out the invention will be described in detail with reference to the drawings. The invention is not limited to the content described in the embodiments below. Further, components described below include a component which is easily supposed by the person skilled in the art and a component which has substantially the same configuration. Further, the components described below may be appropriately combined with one another.

First to Fourth Embodiments

First to fourth embodiments relate to a steering device, and specifically, to a steering column apparatus. Particularly, the embodiments relate to a steering column for a steering device capable of absorbing impact energy while being tilted and moved in a telescopic manner.

Hitherto, a steering device has been used which is able to adjust a steering position by a tilting operation and a telescopic operation and has a function of absorbing impact energy generated in the event of a collision. However, there has been a demand for a steering device capable of more stably absorbing impact without degrading the attachment strength or the stability of the steering device in a vehicle.

As the related art, in a structure disclosed in Prior Art 1 (Japanese Laid-open Patent Publication No. 2007-69800), a contract mechanism includes an outer column and an inner column, and a hook portion of a front end of a telescopic multi-plate is provided so as to be separable from the outer column while coming off from a fixed portion of the outer column. In this case, since the left and right telescopic multi-plates are individually fixed, there is a possibility that the column may be twisted due to an uneven separation load in the left and right direction.

Meanwhile, in a structure disclosed in Prior Art 2 (Japanese Laid-open Patent Publication No. 2009-29152), a fixed portion of a telescopic fixed member slides due to an impact load. In this structure, since the fixed member is inserted into a groove, there is a need to lengthen the groove in order to take a large contract amount. Thus, there is a tendency that the column increases in size.

As described above, there has been a demand for a steering device capable of absorbing more impact energy and having attachment stability thereof while not causing an increase in size.

A first structure for solving the above-described problem is as below. That is, in a telescopic fitting structure including an inner column and an outer column, a T-shaped fixed bracket fixing a friction plate (a so-called telescopic multi-plate) of a fastener portion is detachably fixed to an inner column in a slit of the outer structure. Since the fixed portion is separated from the inner column, it is possible to absorb impact and separate the inner column at a low load while preventing the separation of the column. The fixed bracket and the inner column are provided with a hole, and a pin is inserted and fixed thereinto. When a secondary collision load is input to a steering shaft, the secondary collision load is transmitted to the inner column, and the pin fixing the fixed bracket is sheared, and then a contract equal to or larger than a telescopic contract is allowed while the fixed surface of the fixed bracket relatively displaces with respect to the inner column.

Desirably, a configuration is desirable in which a multi-plate for stabilizing a separation load is disposed at the left and right sides and a fixed surface at the center thereof is separated (in a so-called T-shape). When the impact load is received while the same fixing force is generated at the left and right fixed portions, the impact load is held. Thus, the fixed surface at the center thereof is straightly separated. Further, even when a load balance between the left and right fixed portions is broken, the fixed surface is relatively straightly separated due to the guide in the slit of the outer column, and hence a contract movement is allowed. Further, the column fixing strength is also improved.

Desirably, when a shear pin is formed by an injection method, where a resin is flown into a space at which it is solidified, the play of the fixed portion may be suppressed by overflowing the resin into the space. A resinous pin, a rivet, a bolt, or the like may be used in that the separation load is calculated from the material strength and the area of the shear portion.

A second structure for solving the above-described problem is as below. That is, in a telescopic fitting structure including an inner column and an outer column, a fixed gear lock of the fastener portion is detachably fixed to the inner column in a slot of the outer column. Since the fixed gear lock is separated from the inner column, it is possible to absorb impact and separate the inner column at a low load while preventing the separation of the column. The fixed bracket and the inner column are provided with a hole, and a pin is inserted and fixed thereinto. When a secondary collision load is input to a steering shaft, the secondary collision load is transmitted to the inner column, and the pin fixing the fixed bracket is sheared. Then the fixed surface of the fixed bracket and the inner column relatively displaces and allows a contract equal to or larger than a telescopic contract.

This fixed structure has the following characteristics. (1) Since a gear is pressed in a direction from the downside toward the upside, the inner column is pressed against the upper inner surface of the outer column. (2) A distance bracket extends toward the side surface of the outer column. (3) The inner column is pressed in the lateral direction by the distance bracket with the slit of the outer column interposed therebetween. By these characteristics, the column fixing strength is improved.

Desirably, when the shear pin is formed by the injection method, where the resin is flown into the space at which it is solidified, the play of the fixed portion may be suppressed by overflowing the resin into the space. A resinous pin, a rivet, a bolt, or the like may be used in that the separation load is calculated from the material strength and the area of the shear portion.

Further, the lock mechanism such as the cam attachment tilt bolt, the gear lock, and the fixed gear lock of the present application may be replaced with a known cam (for example, see JP 2001-322552 A) and a flat plate which is not included in a gear of a fixed gear lock to separate the flat plate.

A third structure for solving the above-described problem is as below. That is, in a telescopic fitting structure including the inner column and the outer column, a T-shaped fixed bracket fixing a friction plate (a telescopic multi-plate) of a fastener portion is detachably fixed to the inner column in the slot of the outer column. Since a fixed portion is separated from the inner column, it is possible to absorb impact and separate the inner column at a low load while preventing the separation of the column. The fixed bracket and the inner column are provided with a hole, and a pin is inserted and fixed thereinto. When a secondary collision load is input to a steering shaft, the secondary collision load is transmitted to the inner column, and the pin fixing the fixed bracket is sheared. Then, the fixed surface of the fixed bracket and the inner column relatively displaces and allows a contract equal to or larger than a telescopic contract.

Desirably, it is desirable to configure such that multi-plates for stabilizing a separation load are disposed at the left and right sides, and a fixed surface at the center thereof is separated from the inner column (in a so-called T-shape). When the impact load is received while the same fixing force is generated at the left and right fixed portions, the impact load is held. Thus, the fixed surface at the center thereof is straightly separated. Further, even when a load balance between the left and right fixed portions is broken, the fixed surface is relatively straightly separated due to the guide in the slit of the outer column, and hence a contract movement is allowed. Further, the column fixing strength is also improved.

Desirably, the shear pin is formed by the injection method, where the resin is flown into the space at which it is solidified. At that time, the fixed bracket temporarily closes a hole formed in the inner column so that the shear pin is inserted therethrough by swaging the inner plate to the inner column from the inside thereof. Then, a hole, where the shear pin is inserted therethrough, formed in the fixed bracket is aligned thereto in an overlapping state, and a resin is injected from the hole in the fixed bracket side and is solidified to integrally fix the components. Since the separation load may be calculated from the area of the sheared portion, this method may be used for the stable separation.

Desirably, a resin is provided in the inner plate, and hence the separation of a resin from a resin charging hole may be prevented. When the resin is excessively charged, the play of the fixed portion may be suppressed. The charge amount may be visually checked.

According to the structure, it is possible to absorb energy stably even in the impact caused by a comparatively low load, and to prevent degradation in the stability of attaching the steering device in the vehicle.

Figure 2:
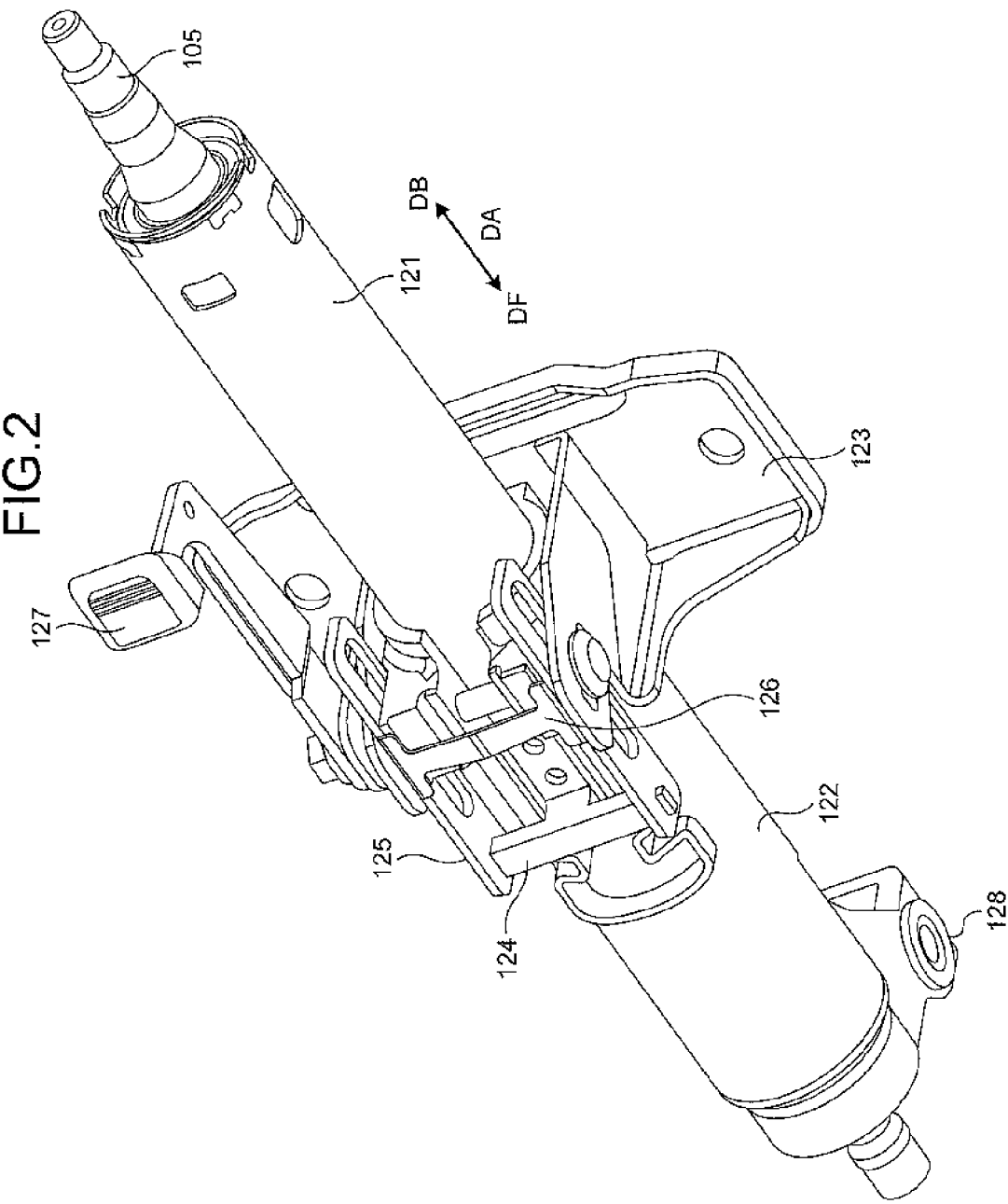
FIG. 2 is a perspective view illustrating a steering column apparatus of the steering device of the first to fourth embodiments.
Figure 3:
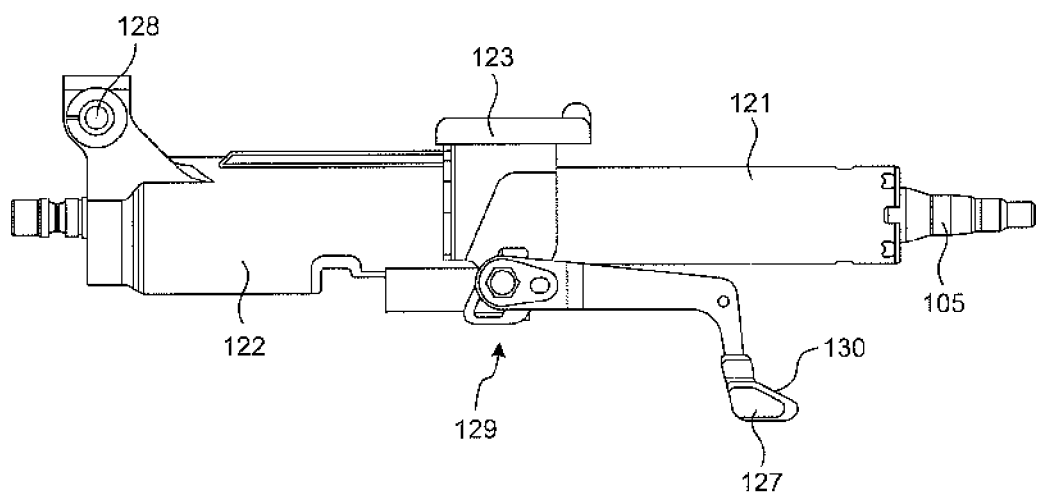
FIG. 3 is a diagram illustrating a side surface of the steering column apparatus according to the first to fourth embodiments.
Figure 4:
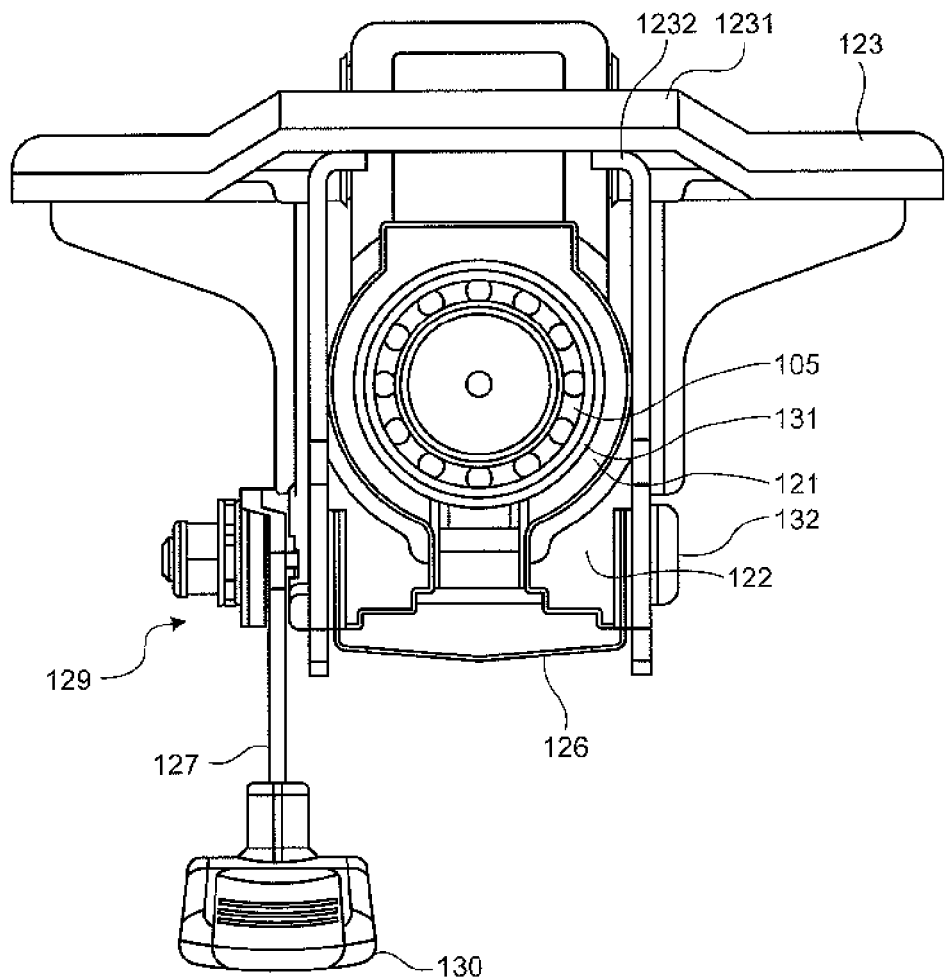
FIG. 4 is a diagram illustrating a front surface (at the rear side) of the steering column apparatus according to the first to fourth embodiments.
Figure 5:
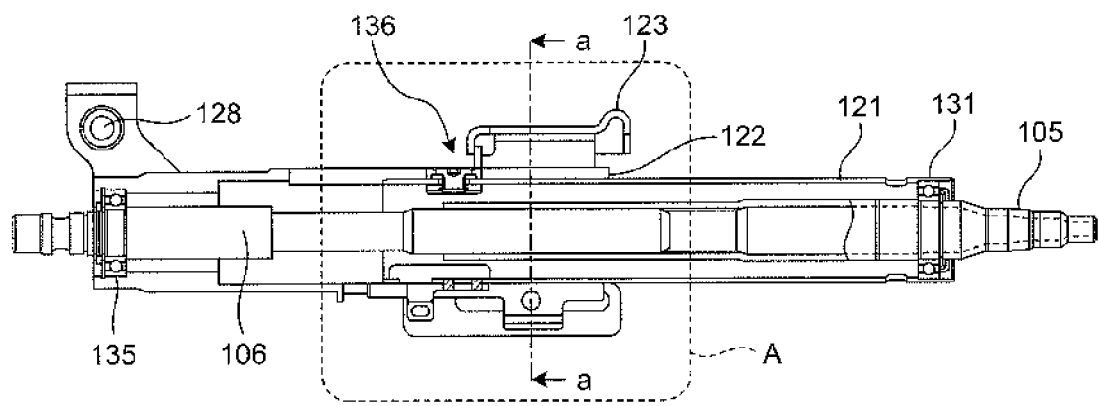
FIG. 5 is a diagram illustrating a side surface (a part of a cross section) of the steering column apparatus according to the first embodiment.
Figure 6:
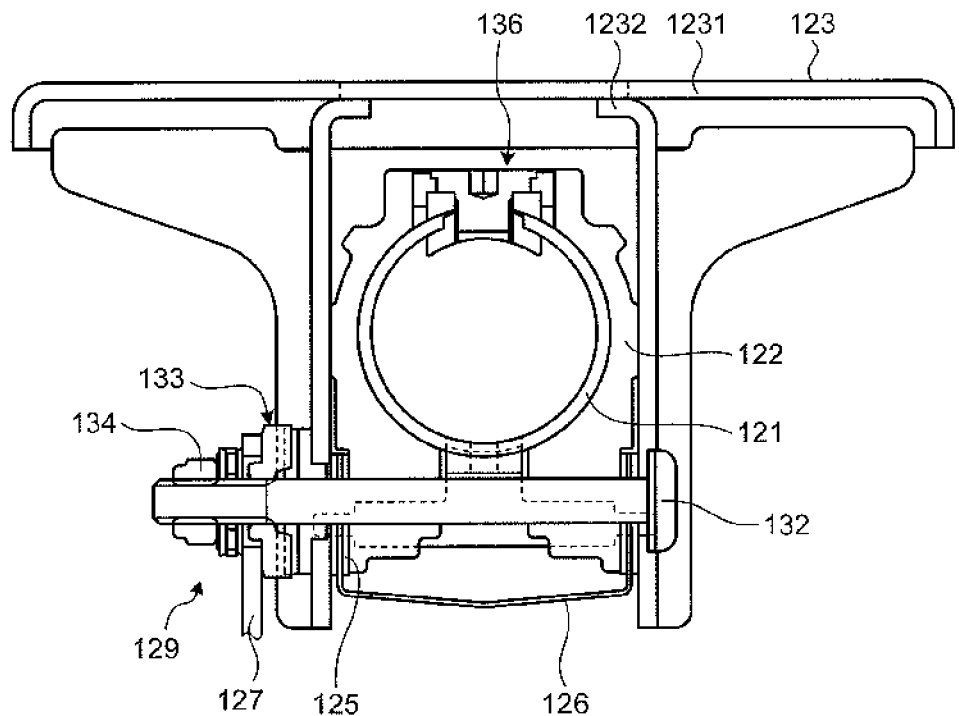
FIG. 6 is a cross-sectional view taken along the line a-a of FIG. 5.
Figure 7:
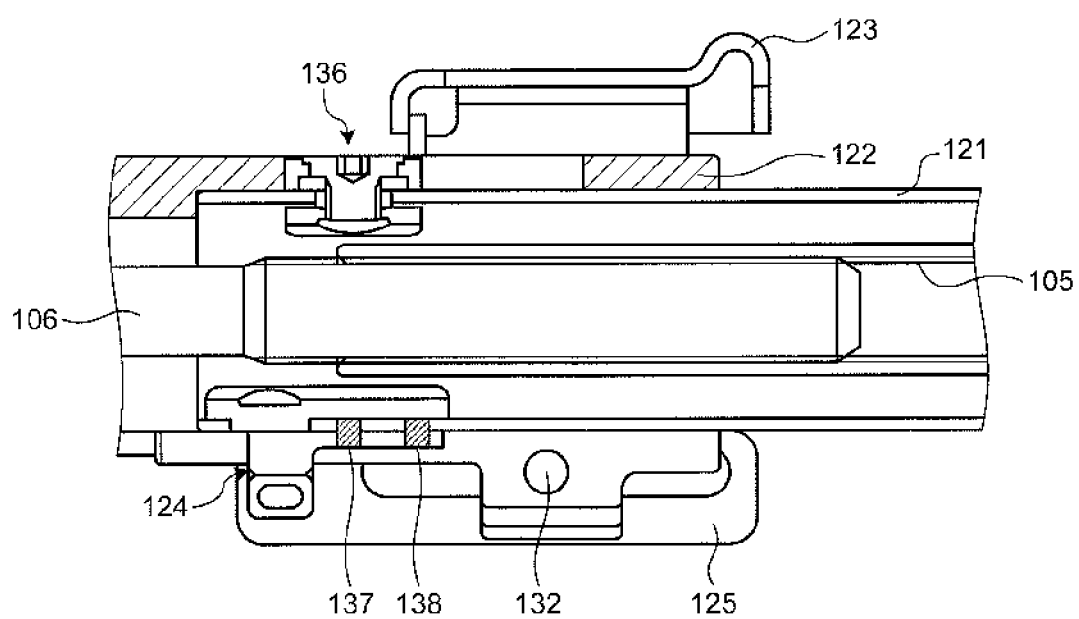
FIG. 7 is an enlarged diagram illustrating a part A of FIG. 5.
Figure 8:
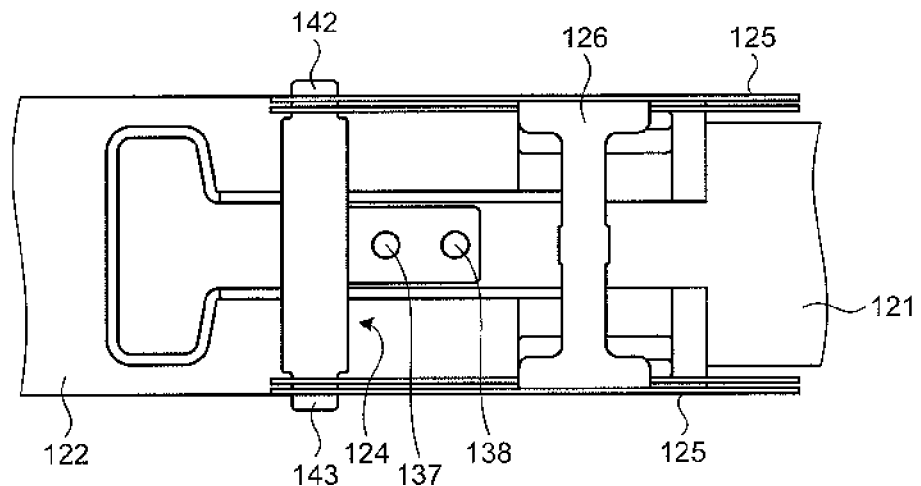
FIG. 8 is a diagram (a bottom view of the steering column apparatus) illustrating a bottom surface of FIG. 7.
Figure 9:
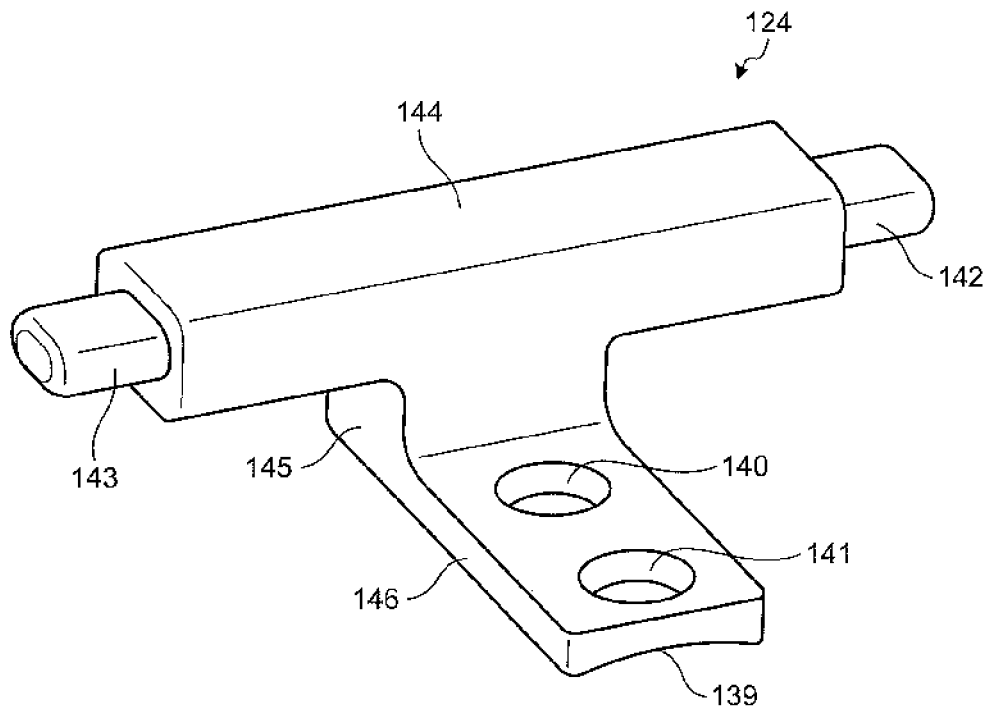
FIG. 9 is a perspective view illustrating a fixed bracket according to the first embodiment.
Figure 10:
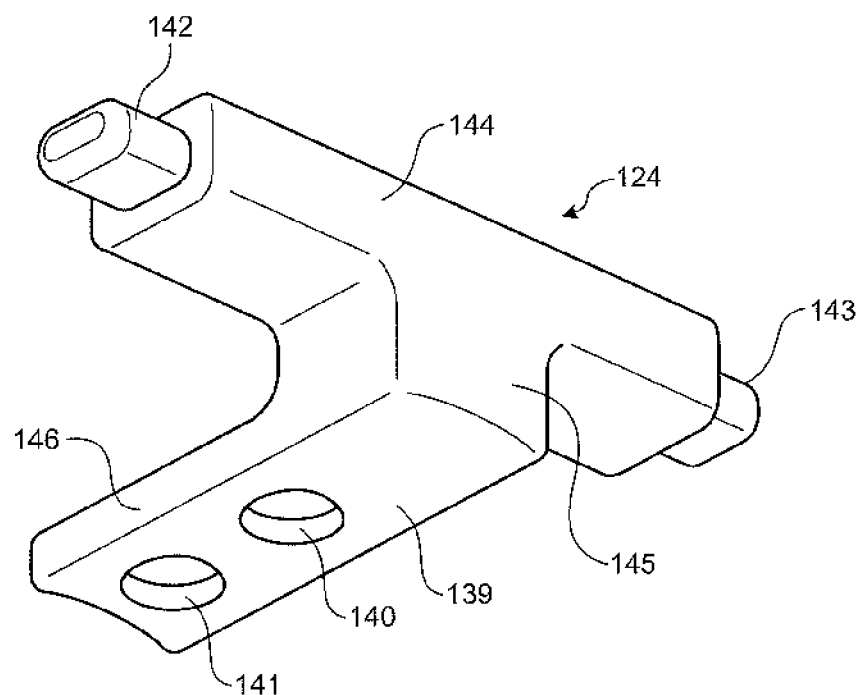
FIG. 10 is a perspective view illustrating the fixed bracket according to the first embodiment.
Figure 11:
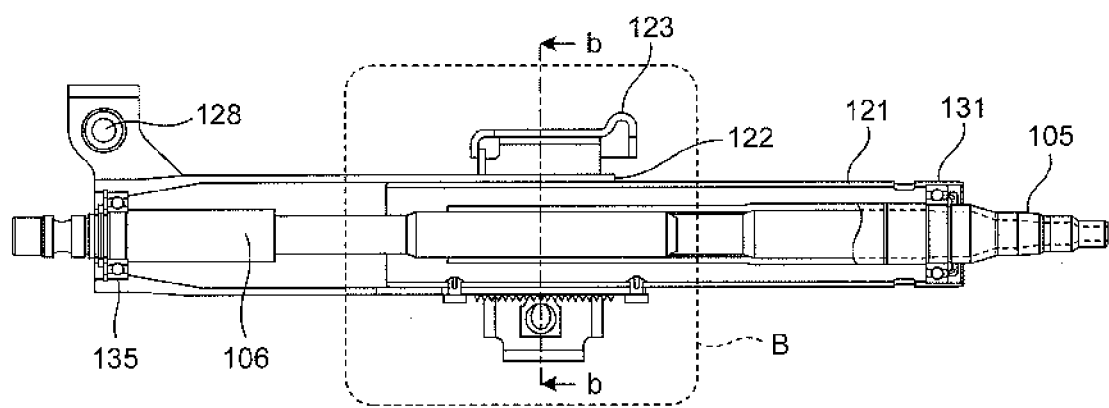
FIG. 11 is a diagram illustrating a side surface (a part of a cross section) of the steering column apparatus of the second embodiment.
Figure 12:
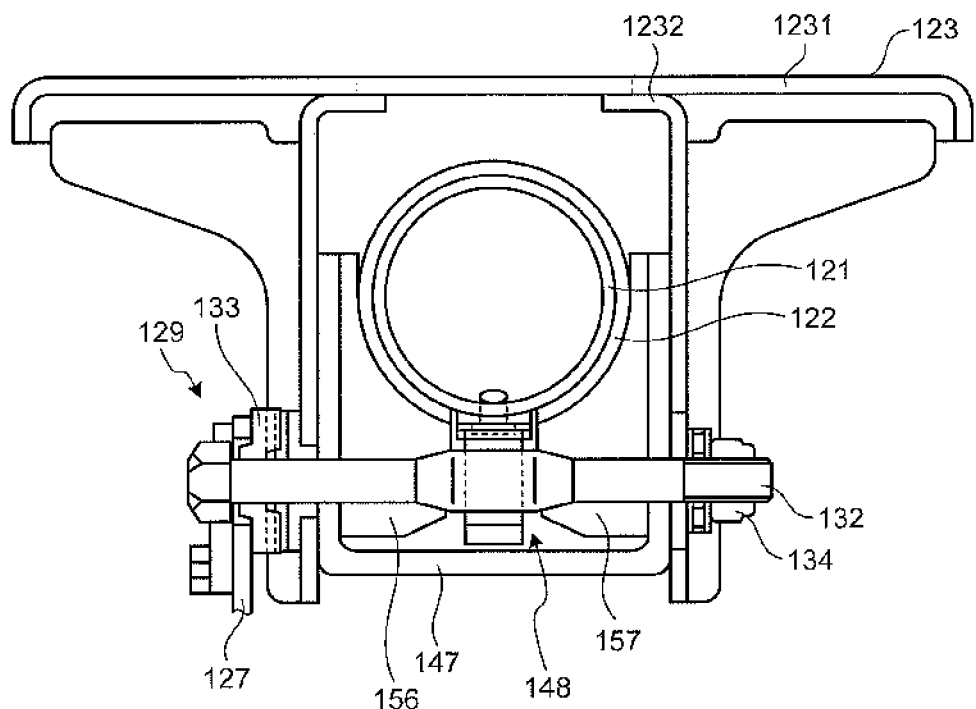
FIG. 12 is a cross-sectional view taken along the line b-b of FIG. 11.
Figure 13:
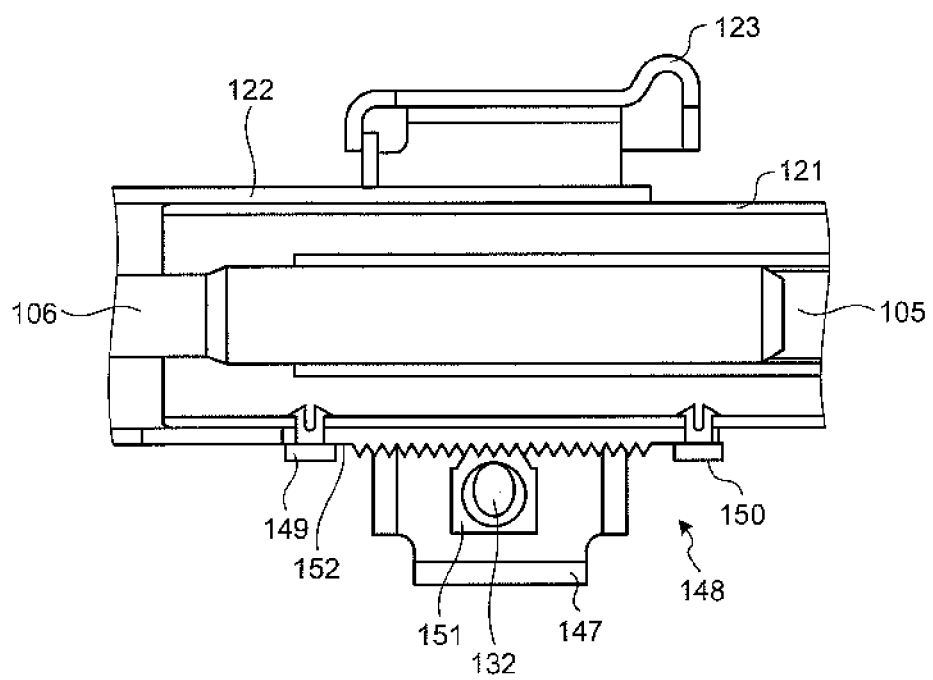
FIG. 13 is an enlarged diagram illustrating a part B of FIG. 11.
Figure 14:
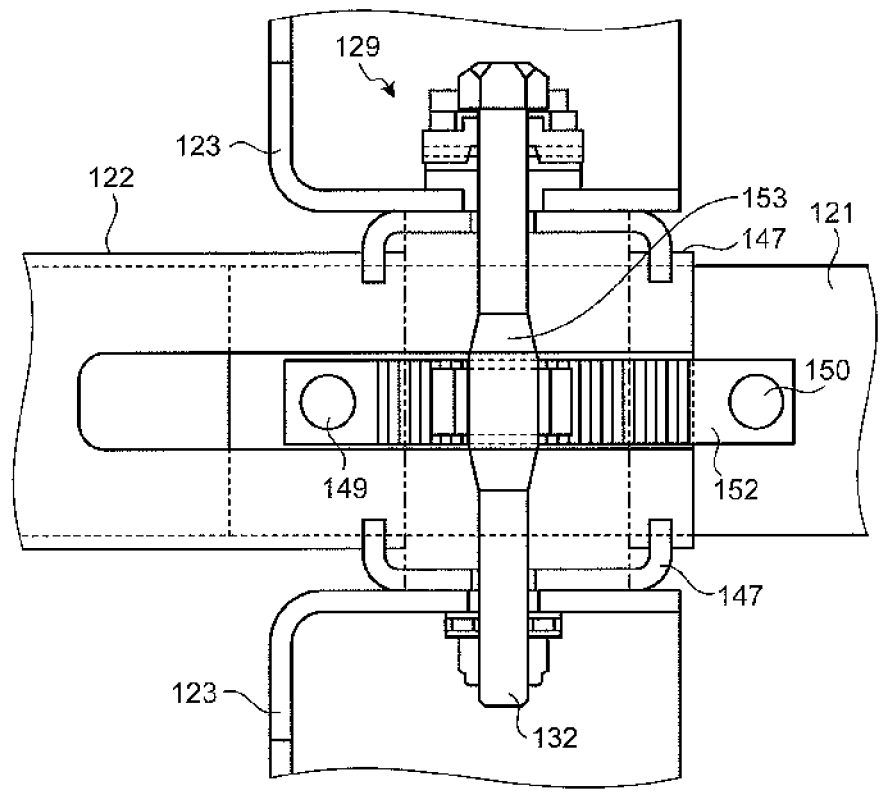
FIG. 14 is a diagram (a bottom view of the steering column apparatus) illustrating a bottom surface of FIG. 11.
Figure 15:
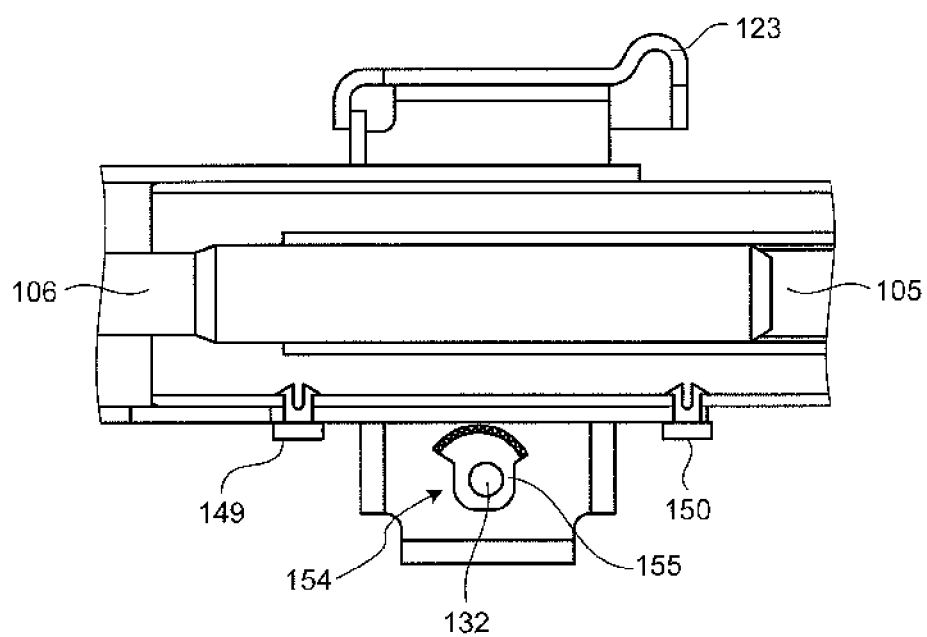
FIG. 15 is a diagram similar to FIG. 13 illustrating a modified example of the second embodiment.
Figure 16:
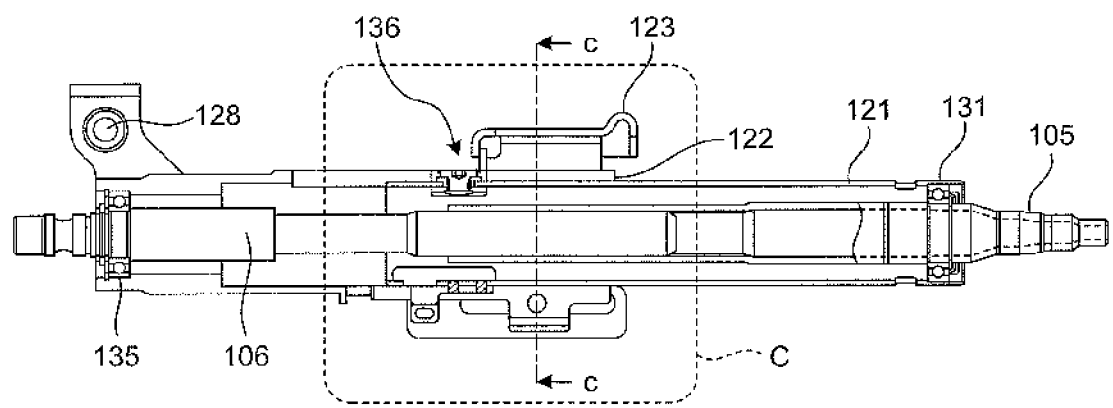
FIG. 16 is a diagram illustrating a side surface (a part of a cross section) of the steering column apparatus of the third embodiment.
Figure 17:
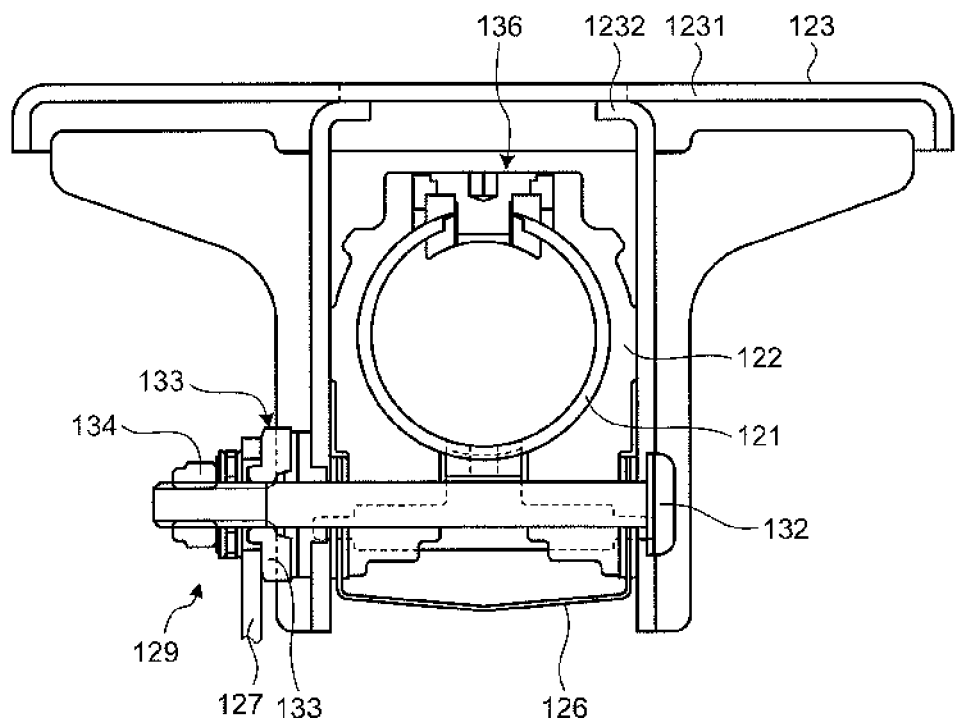
FIG. 17 is a cross-sectional view taken along the line c-c of FIG. 16.
Figure 18:
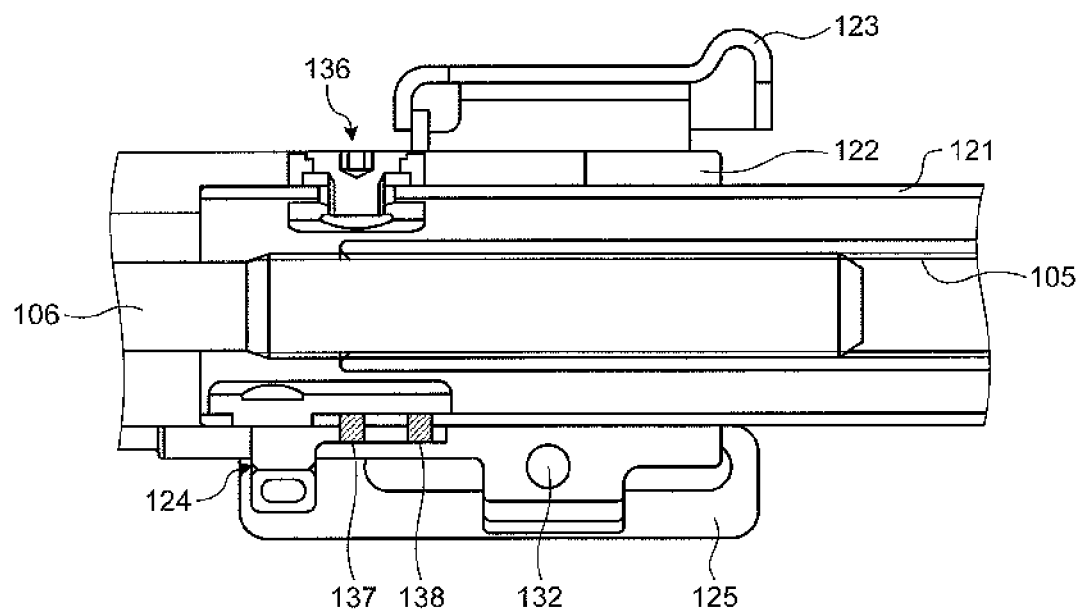
FIG. 18 is an enlarged diagram illustrating a part C of FIG. 16.
Figure 19:
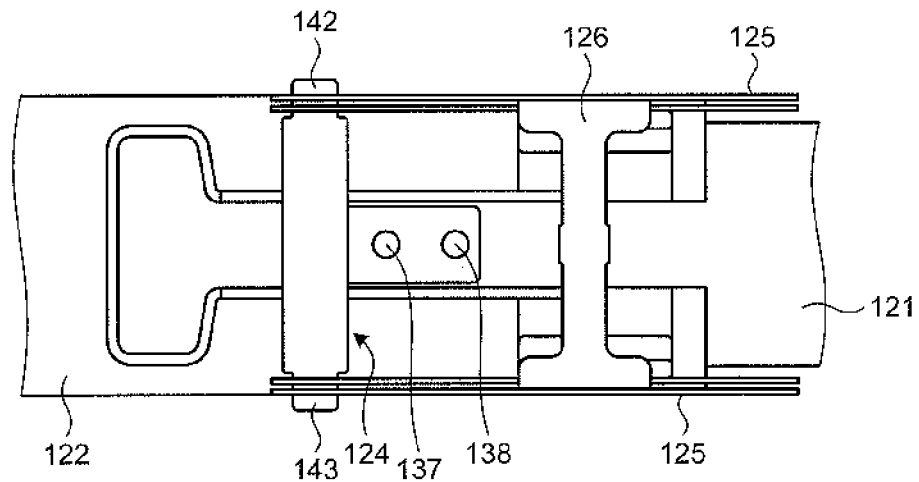
FIG. 19 is a diagram (a bottom view of the steering column apparatus) illustrating a bottom surface of FIG. 16.
Figure 20A:
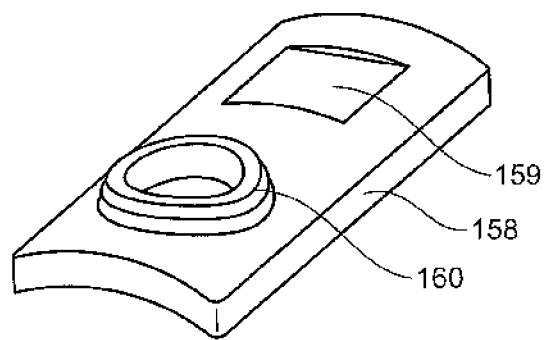
FIGS. 20(a) and 20(b) are diagrams illustrating an inner plate according to the third embodiment.
Figure 20B:
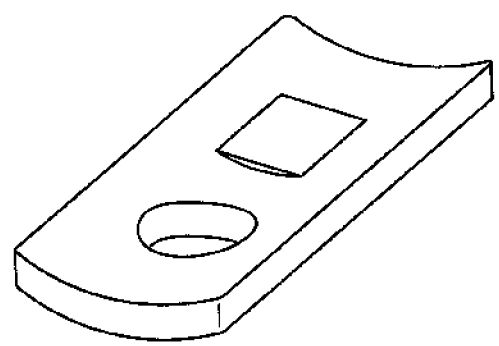
Figure 21A:
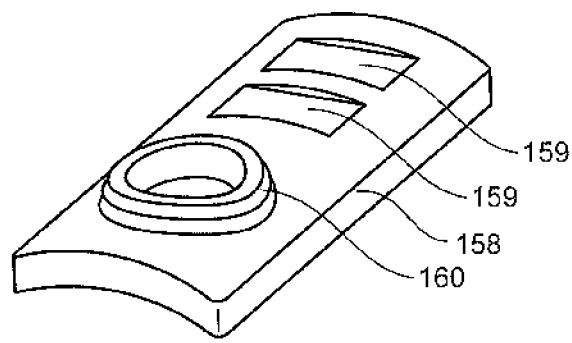
FIGS. 21(a) and 21(b) are diagrams illustrating an inner plate according to a modified example of the third embodiment.
Figure 21B:
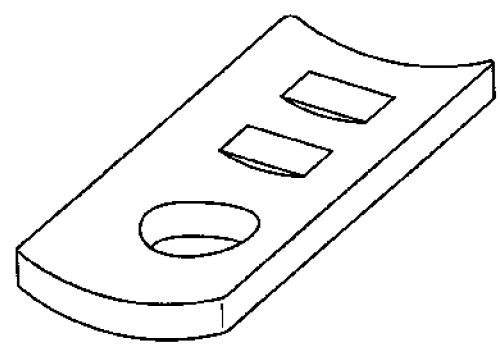
Figure 22:
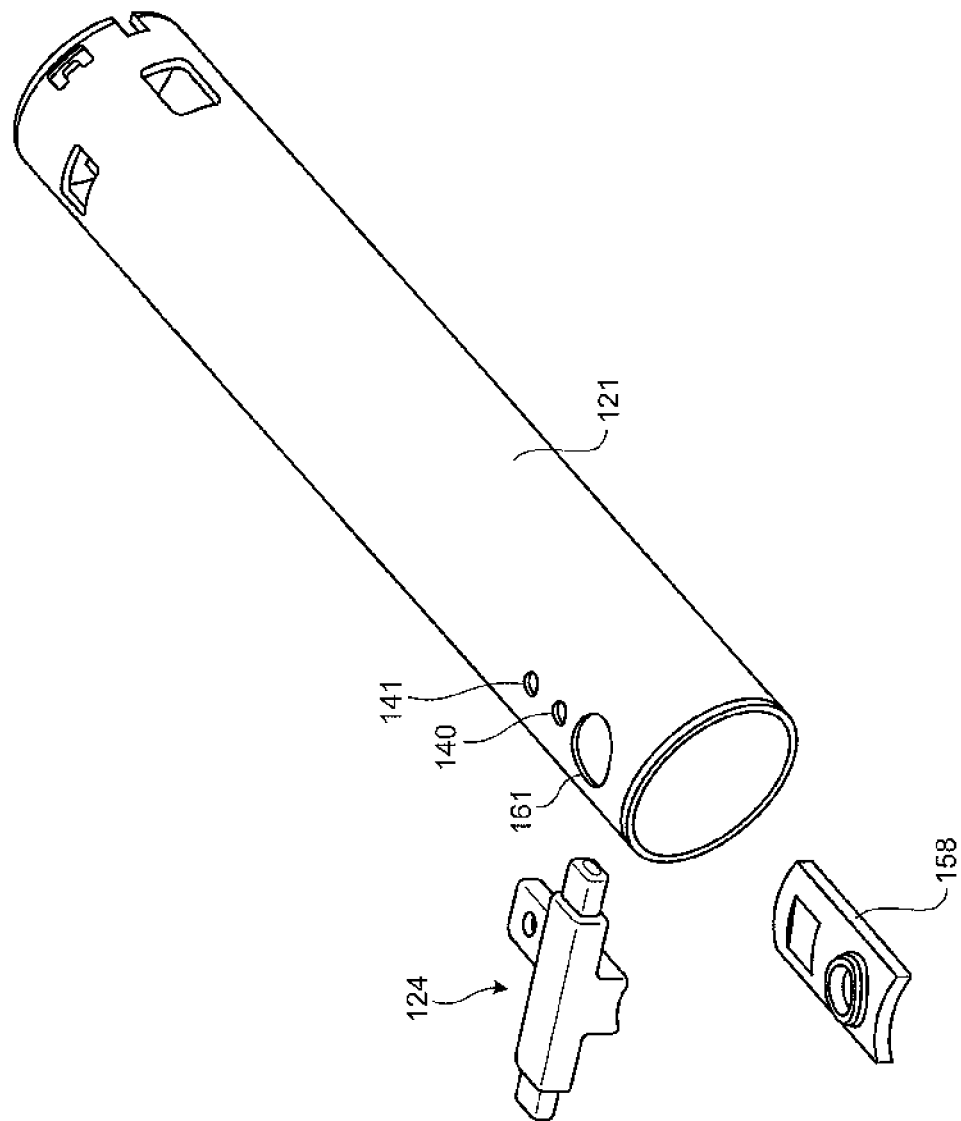
FIG. 22 is a diagram illustrating an inner plate attachment method according to the third embodiment.
Figure 23A:
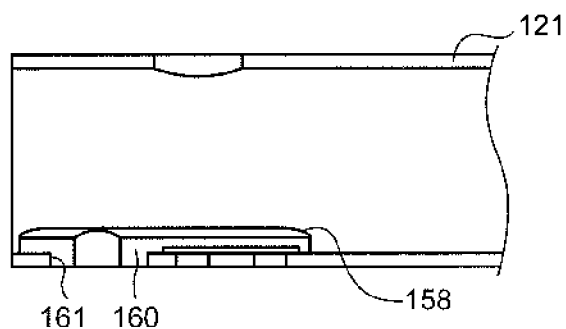
FIGS. 23(a), 23(b), 23(c) and 23(d) are diagrams illustrating an inner plate attachment method according to the third embodiment.
Figure 23B:
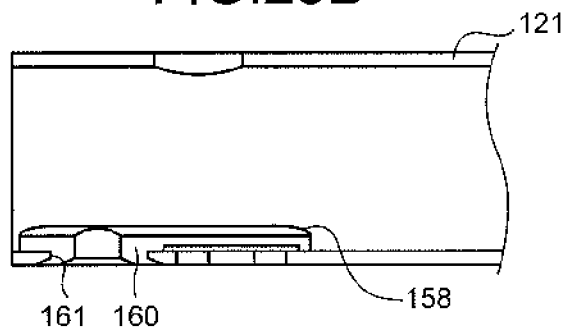
Figure 23C:
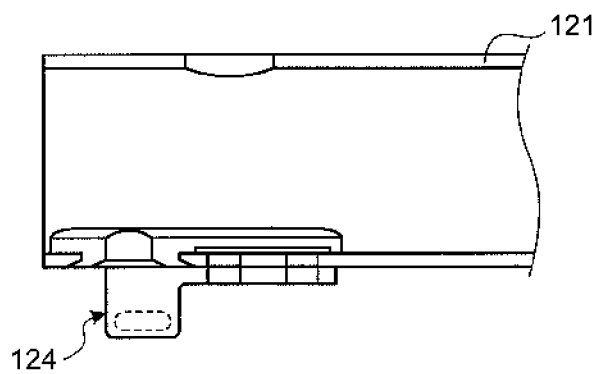
Figure 23D:
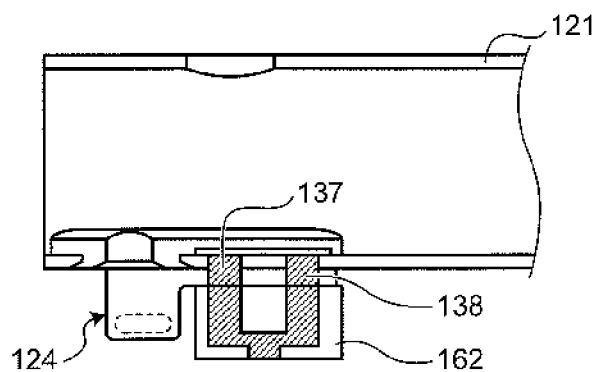

Hereinafter, this structure will be described in detail with reference to FIGS. 1 to 23. FIGS. 1 to 4 schematically illustrate the first to fourth embodiments. FIGS. 5 to 10 specifically illustrate the structure of the first embodiment. Similarly, FIGS. 11 to 15 specifically illustrate the structure of the second embodiment, and FIGS. 16 to 23 specifically illustrate the structure of the third embodiment. In FIG. 2, the axial direction DA indicates the axial direction of the steering shaft, and the front side DF and the rear side DB indicate the front side and the rear side of the vehicle body when the steering device is attached to the vehicle body.

A steering column apparatus according to the first embodiment is a steering column apparatus that supports a steering shaft. Here, the steering column apparatus includes an inner column and an outer column and contracts in the axial direction so as to be adjusted in a telescopic manner and to absorb impact. The steering column apparatus may be tilted through a tilt bracket attached to a vehicle body. Then, the outer column is tightened by a tightening mechanism provided in the tilt bracket so as to hold the inner column. Here, a telescopic multi-plate is provided so as to increase the friction surface of the tightening mechanism. Further, the telescopic multi-plate is fixed to a fixed bracket provided in a slit of the outer column at the bottom surface side of the column, and a shear pin is inserted through a hole in a side surface of the inner column and a hole in a side surface of the fixed bracket, thereby detachably supporting the inner column from the fixed bracket.

That is, the first embodiment relates to a steering column apparatus 120 that supports a steering shaft including a male steering shaft 106 and a female steering shaft 105. Here, a steering column apparatus 120 includes an inner column 121 and an outer column 122 and contracts in the axial direction so as to be adjusted in a telescopic manner and to absorb impact, and may be tilted through a tilt bracket 123 attached to a vehicle body. Then, a tightening mechanism 129, provided in the tilt bracket 123, tightens the outer column 122 so as to hold the inner column 121. Here, a telescopic multi-plate 125 is provided so as to increase the friction surface of the tightening mechanism 129. The telescopic multi-plate 125 is fixed to a fixed bracket 124 provided in a slit of the outer column 122 at the bottom surface side of the columns (121, 122), and a hole of the inner column 121 and a hole of the fixed bracket 124 match each other so as to insert the shear pin through the holes of the inner column 121 and the fixed bracket 124, thereby the inner column 121 is detachably supported from the fixed bracket 124.

A steering column apparatus according to the second embodiment is a steering column apparatus that supports a steering shaft. Here, the steering column apparatus includes an inner column and an outer column and contracts in the axial direction relatively so as to be operated in a telescopic manner and to absorb impact, and the steering column apparatus is attached to a vehicle body so as to be tilted through a tilt bracket attached to the vehicle body. The tilt bracket includes a tightening mechanism which holds the inner column by tightening the outer column. The outer column includes a slit, and the inner column is gripped by a pressing bracket which presses the inner column by the action of the tightening mechanism in the left and right direction of the slit. Furthermore, a fixed plate detachably attached to the inner column is disposed in the slit, and the tightening mechanism is provided with a tilt lever which presses a cam in a direction from the downside of the fixed plate toward the upside thereof, by rotating the cam at the center of a tilt lever with the rotation of the tilt lever and holding the cam thereat.

That is, the second embodiment relates to the steering column apparatus 120 that supports the steering shaft including the male steering shaft 106 and the female steering shaft 105. Here, the steering column apparatus 120 includes the inner column 121 and the outer column 122 and contracts in the axial direction so as to be operated in a telescopic manner and to absorb impact. The steering column apparatus 120 is attached to the vehicle body so as to be tilted through the tilt bracket 123 attached to the vehicle body. Further, the tilt bracket 123 includes the tightening mechanism 129 which holds the inner column 121 by tightening the outer column 122. The outer column 122 includes a slit, and the inner column 121 is gripped by a pressing bracket 1232 which presses the inner column by the action of the tightening mechanism 129 in the left and right direction of the slit. Furthermore, a cam and gear mechanism 148 serving as a fixed plate detachably attached to the inner column 121 is disposed in the slit, and the tightening mechanism 129 is provided with a tilt lever which presses a cam portion provided in a tilt bolt center portion 153 in a direction from the downside of the fixed plate toward the upside thereof by rotating a cam lock mechanism 133, as a cam at the center of a tilt lever 127, with the rotation of the tilt lever and holding the cam thereat.

A steering column apparatus according to the third embodiment is a steering column apparatus that supports a steering shaft. Here, the steering column apparatus includes an inner column and an outer column and contracts in the axial direction so as to be adjusted in a telescopic manner and to absorb impact. The steering column apparatus includes a tilt bracket provided in a vehicle body, and is attached to the vehicle body in a tiltable state. Then, the tilt bracket, the outer column, and a telescopic multi-plate as a friction plate are tightened by a tightening mechanism so as to hold the inner column fitted into the outer column. Further, the outer column includes a slit, and the inner column is gripped by a pressing bracket which presses the inner column in the left and right direction of the slit in the tightening mechanism. Furthermore, a fixed plate which is detachably attached to the inner column is disposed in the slit, and the fixed bracket which fixes the friction plate is coupled and fixed to the inner column by a resin injection-molding process.

The third embodiment relates to a steering column apparatus that supports a steering shaft. Here, the steering column apparatus includes an inner column and an outer column and contracts in the axial direction so as to be adjusted in a telescopic manner and to absorb impact. The steering column apparatus includes a tilt bracket provided in a vehicle body, and is attached to the vehicle body in a tiltable state. Then, the tilt bracket, the outer column, and a telescopic multi-plate as a friction plate are tightened by a tightening mechanism so as to hold the inner column fitted into the outer column. Further, the outer column includes a slit, and the inner column is gripped by a pressing bracket which presses the inner column in the left and right direction of the slit in the tightening mechanism. Furthermore, an inner plate 158 which is a fixed plate as a friction plate detachably attached to the inner column is disposed in the slit, and the fixed bracket which fixes the friction plate is coupled and fixed to the inner column by shear pins 137 and 138 formed by an injection-molding process.

The fourth embodiment relates to a steering device that includes the steering column apparatus according to any one of the first to third embodiments.

The steering device of the fourth embodiment may be appropriately used as a vehicle steering device.

Fifth Embodiment

Figure 24:
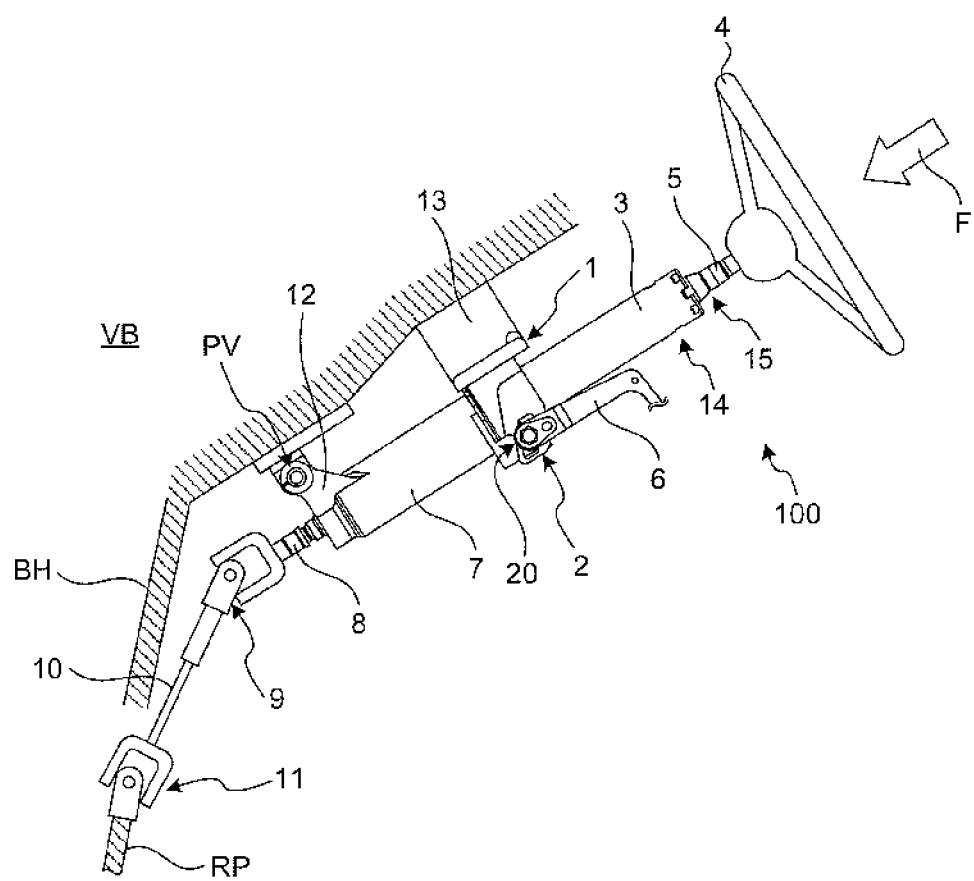
FIG. 24 is a diagram illustrating an attachment state of a steering device according to a fifth embodiment.

FIG. 24 is a diagram illustrating a configuration of a steering device according to a fifth embodiment. Referring to FIG. 24, the outline of the steering device according to the fifth embodiment will be described. Further, in the description below, the front side of the vehicle body, when a steering device 100 is attached to the vehicle body, will be simply referred to as the front side, and the rear side of the vehicle body, when the steering device 100 is attached to the vehicle body, will be simply referred to as the rear side. In FIG. 24, the front side indicates the left side of the drawing, and the rear side indicates the right side of the drawing.

The steering device 100 is provided in the vehicle body VB, and includes a steering wheel 4, a steering shaft 15, a universal joint 9, a lower shaft 10, and a universal joint 11 in order in which a force F applied by an operator is transmitted. The steering device is connected to a rack and pinion RP.

The steering shaft 15 includes an input shaft 5 and an output shaft 8. In the input shaft 5, one end is connected to the steering wheel 4 and the other end is connected to the output shaft 8. In the output shaft 8, one end is connected to the input shaft 5 inside the steering column and the other end is connected to the universal joint 9. In the fifth embodiment, the input shaft 5 and the output shaft 8 are made of iron or the like.

In the lower shaft 10, one end is connected to the universal joint 9 and the other end is connected to the universal joint 11. In the rack and pinion RP, one end is connected to the universal joint 11.

Further, the steering device 100 includes a steering column 14 that includes a cylindrical inner column 3, which rotatably supports the input shaft 5, and a cylindrical outer column 7 into which at least a part of the inner column 3 is inserted. The inner column 3 is disposed at the rear side of the outer column 7. In the description below, the axial direction of the inner column 3 and the axial direction of the outer column 7 will be appropriately and simply referred to as the axial direction.

The steering device 100 includes a column bracket 1 which is fixed to a vehicle body side member 13 and supports the outer column 7. The column bracket 1 is fixed to the vehicle body side member 13 by a bolt or the like not to be detachable therefrom.

Further, the outer column 7 includes a pivot bracket 12 which is provided at the front end. The pivot bracket 12 is supported by the vehicle body VB so as to be rotatable about the rotation shaft PV. The rotation shaft PV is parallel to, for example, the horizontal direction. Accordingly, the outer column 7 is supported so as to be tilted in the vertical direction. An operator may adjust the position of the steering column 14 in the tilt direction, after rotating a manipulation lever 6, by tilting the steering column 14 through the steering wheel 4. Further, after rotating the manipulation lever 6, the operator may adjust the telescopic position by moving the inner column 3 through the steering wheel 4.

The lower shaft 10 is disposed near a bulkhead BH having a partition wall shape and separating a vehicle room and an engine room from each other. The pinion of the rack and pinion RP engages with a rack shaft (not illustrated). Accordingly, a steering torque (including an auxiliary steering torque) output through the output shaft 8 is transmitted to the lower shaft 10 through the universal joint 9, and then is transmitted to the pinion through the universal joint 11. The steering force transmitted to the pinion is transmitted to a tie rod (not illustrated) through a steering gear (not illustrated) and a rack (not illustrated), so that a steered wheel (not illustrated) is steered.

With the above-described structure, the outer column 7 is supported by the vehicle body VB through the vehicle body side member 13. Accordingly, in the event of a secondary collision, when a force is transmitted from the steering wheel 4 to the steering column 14, the inner column 3 is inserted into the outer column 7 and accommodated within the outer column 7, while the outer column 7 is fixed to the vehicle body VB, and therefore an impact applied from the steering wheel 4 to the operator is reduced. When the weight of the operator is light, since the setting value of the separation load, in which the inner column 3 of the steering column 14 moves toward the front side of the vehicle body, may be decreased, a pressure generated by the squeezing of the column bracket 1 is decreased to decrease a friction force between the inner column 3 and the outer column 7. Therefore, when the friction force generated between the inner column 3 and the outer column 7 is too low, there is a possibility that a load generated by a factor other than the secondary collision may also exceed the separation load. For this reason, the steering device 100 of the fifth embodiment includes a second tightening mechanism 2 in addition to a first tightening mechanism 20 which generates a pressure while being squeezed by the column bracket 1.

Figure 25:
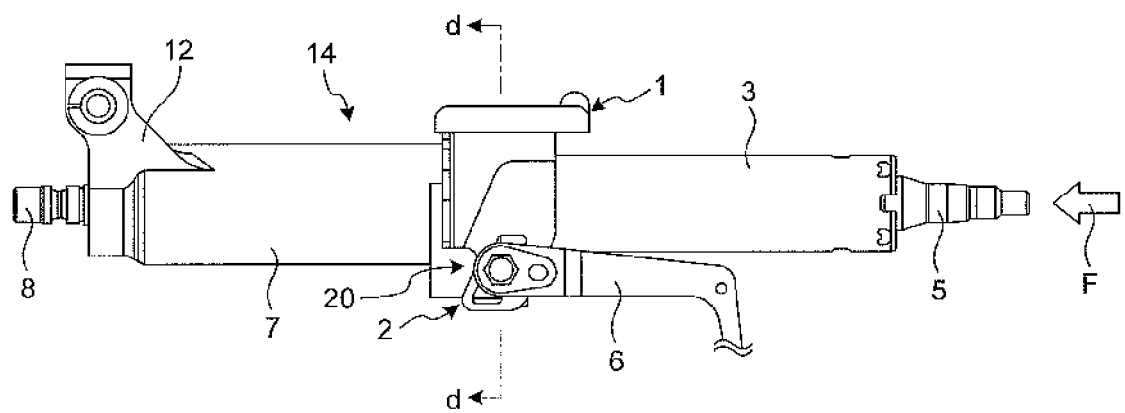
FIG. 25 is a side view schematically illustrating a steering column of the steering device according to the fifth embodiment.
Figure 26:
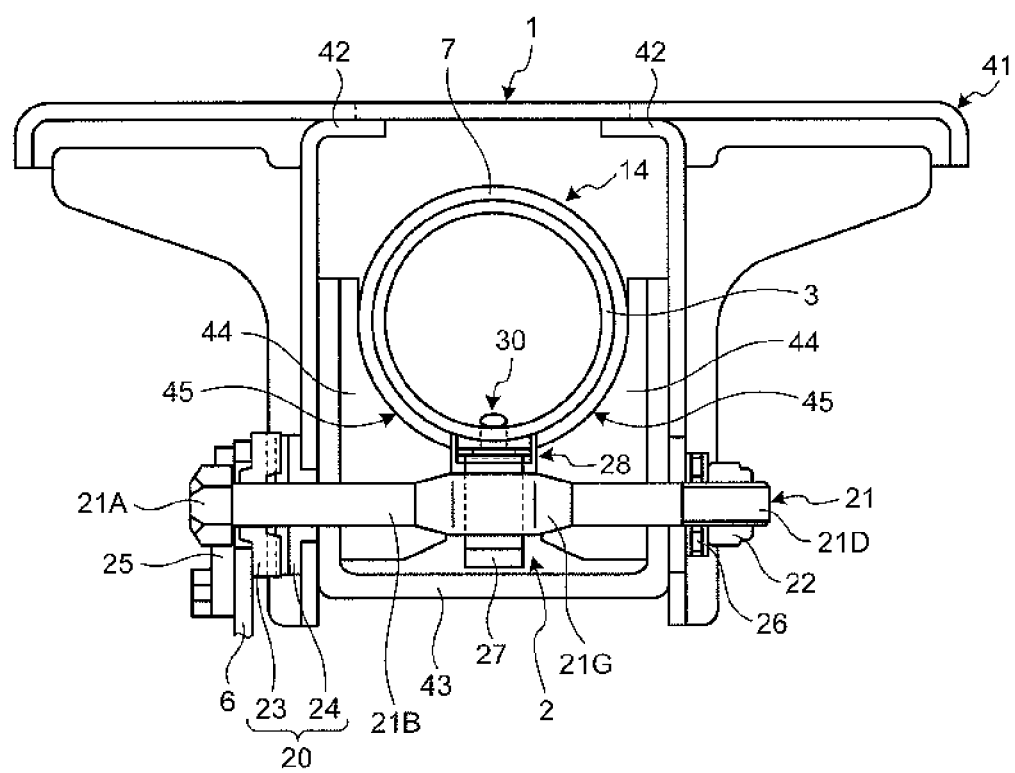
FIG. 26 is a cross-sectional view taken along the line d-d of FIG. 25.
Figure 27:
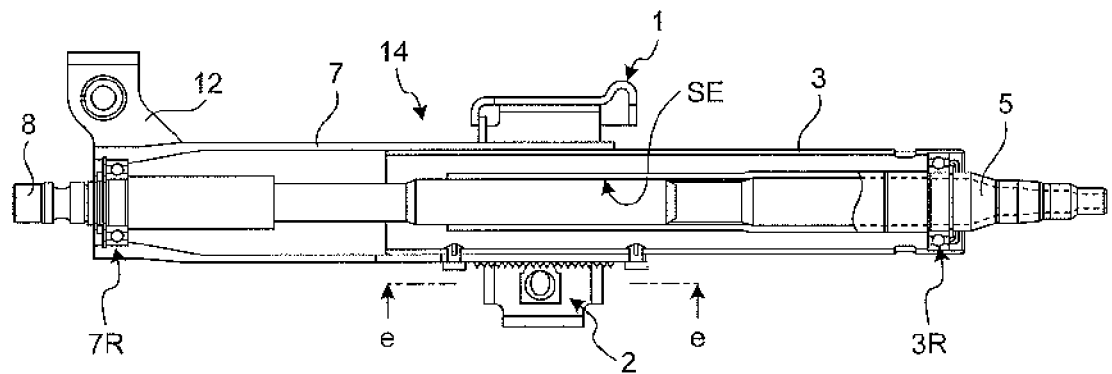
FIG. 27 is a cross-sectional view schematically illustrating a cross section including rotation shafts of an input shaft and an output shaft of FIG. 25.
Figure 28:
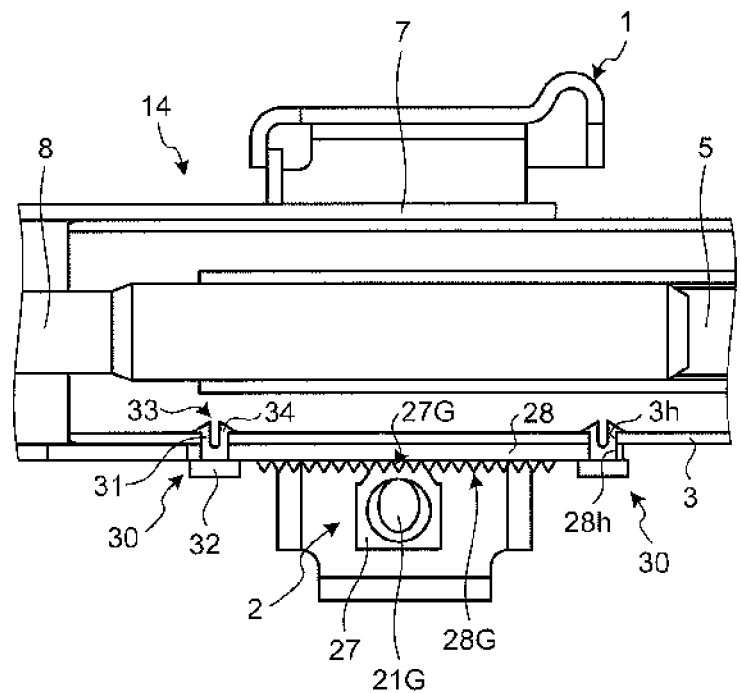
FIG. 28 is a diagram illustrating a state where a second tightening mechanism according to the fifth embodiment is fixed.
Figure 29:
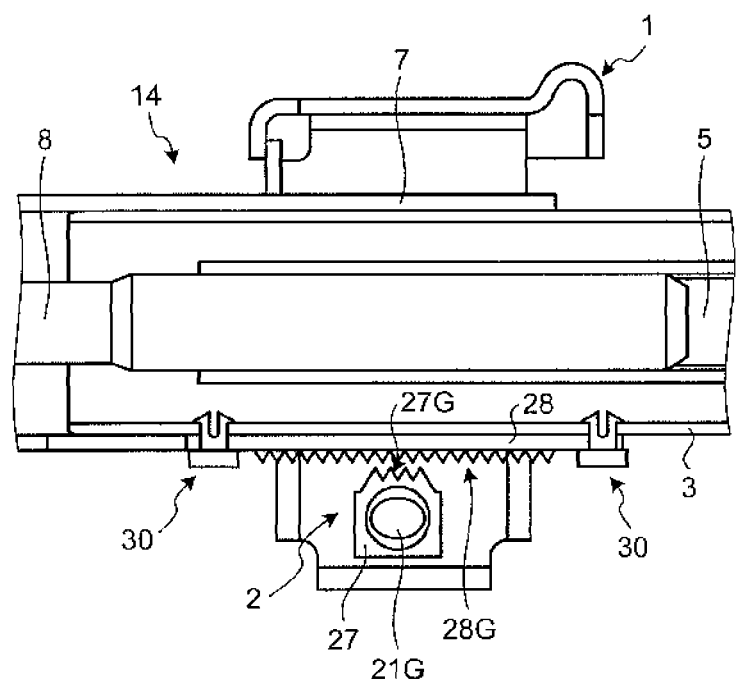
FIG. 29 is a diagram illustrating a state where a fixing operation of the second tightening mechanism according to the fifth embodiment is released.
Figure 30:
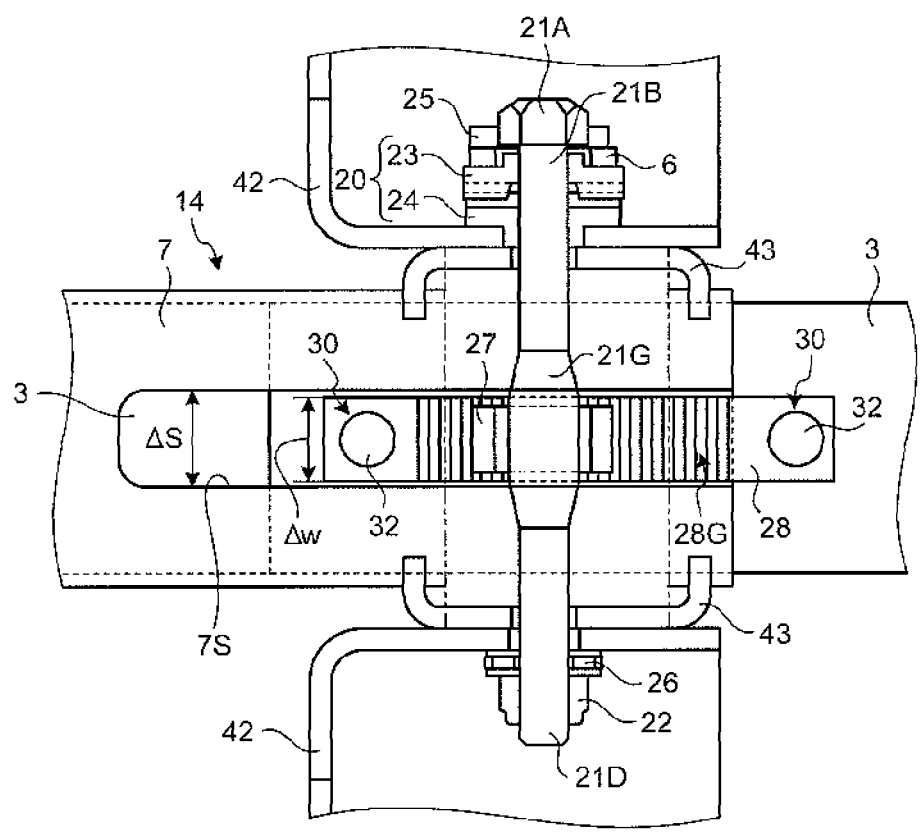
FIG. 30 is a top view illustrating the second tightening mechanism according to the fifth embodiment when viewed from the downside in the tilt direction.

FIG. 25 is a side view schematically illustrating the steering column of the steering device according to the fifth embodiment. FIG. 26 is a cross-sectional view taken along the line d-d of FIG. 25. FIG. 27 is a cross-sectional view schematically illustrating a cross section including the rotation shafts of the input shaft and the output shaft of FIG. 25. FIG. 28 is a diagram illustrating a state where the second tightening mechanism according to the fifth embodiment is fixed. FIG. 29 is a diagram illustrating a state where a fixing operation of the second tightening mechanism according to the fifth embodiment is released. FIG. 30 is a top view illustrating the second tightening mechanism according to the fifth embodiment when viewed from the downside in the tilt direction. Further, FIG. 30 is a perspective view when viewed from the direction e-e of FIG. 27. Referring to FIGS. 24 to 30, the second tightening mechanism 2 of the steering device 100 will be described.

In addition, the input shaft 5 and the output shaft 8 are not illustrated in FIG. 26. For example, as illustrated in FIG. 27, the inner column 3 includes a bearing 3R which rotatably supports the input shaft 5. The outer column 7 includes a bearing 7R which rotatably supports the output shaft 8. The inner column 3 is inserted into the outer column 7 so that at least a part of the outer periphery surface faces the inner surface of the outer column 7. Here, the facing portion is provided with a power transmission mechanism SE such as a serration or a spline, and hence the rotation of the input shaft 5 may be transmitted as the rotation of the output shaft 8.

As illustrated in FIG. 26 as the cross section taken along the line d-d of FIG. 25, the column bracket 1 includes an attachment plate portion 41 which is fixed to the vehicle body side member 13 illustrated in FIG. 24 and a pressing bracket 42 which is fixed to the attachment plate portion 41 so as to squeeze the outer column 7. The pressing bracket 42 is disposed at both sides of the outer column 7, and tightens the outer column 7 through a distance bracket 43. Further, the pressing bracket 42 is provided with a tilt adjustment hole as an elongated hole, and a tilt bolt 21 which rotates along with the rotation of the manipulation lever 6 is inserted thereinto. The distance bracket 43 includes a positioning portion 44 which includes a semi-circular concave portion for positioning the outer column 7, and is fixed to a fixed position 45 contacting the outer column 7 by welding or the like. The outer column 7 and the distance bracket 43 are integrally molded by aluminum die-casting.

The first tightening mechanism 20 is a cam mechanism and includes a first rotation cam portion 23, which is attached to the manipulation lever 6 so as to rotate together, and a first fixed cam portion 24, which is slidably attached to the tilt adjustment hole of the column bracket 1 not rotatable along with the rotation of the manipulation lever 6. The first rotation cam portion 23 and the first fixed cam portion 24 are formed to have a slope therebetween in the circumferential direction. Then, when the first rotation cam portion 23 and the first fixed cam portion 24 are rotated relatively, the distance between the first rotation cam portion and the first fixed cam portion changes in response to the rotation position of the first rotation cam portion 23.

The tilt bolt 21 includes a tilt bolt head portion 21A, a bolt body 21B, a second rotation cam portion 21G, and a screw portion 21D. The tilt bolt 21 is inserted through the manipulation lever 6, the first rotation cam portion 23, the first fixed cam portion 24, the pressing bracket 42, the distance bracket 43, the pressing bracket 42, and a thrust bearing 26. A caulking nut 22 is screwed on the screw portion 21D. A spin stopper 25, which is fixed to the tilt bolt head portion 21A squeezing the first fixed cam portion 24 and the manipulation lever 6, interlocks rotation of the manipulation lever 6, and rotation of the tilt bolt 21 and the first rotation cam portion 23. Since the distance between the first rotation cam portion 23 and the first fixed cam portion 24 changes in response to the rotation position of the first rotation cam portion 23, the tilt bolt 21 is movably supported in the axial direction thereof.

Further, since the distance between the first rotation cam portion 23 and the first fixed cam portion 24 changes in response to the rotation position of the first rotation cam portion 23, the pressure of squeezing the pressing bracket 42 decreases when the distance between the first rotation cam portion 23 and the first fixed cam portion 24 decreases. For this reason, a tightening force applied to the pressing bracket 42 may be loosened in response to the rotation of the manipulation lever 6, and hence a friction force of the pressing bracket 42 and the outer column 7 disappears or decreases. Accordingly, the operator may tilt the steering column 14 in a vertical direction along the length direction of the tilt adjustment hole through the steering wheel 4 by rotating the manipulation lever 6. Then, the operator may adjust the tilt position of the outer column 7. Further, when the tightening force applied to the pressing bracket 42 may be loosened in response to the rotation of the manipulation lever 6, the width of a slit 7S of the outer column 7 illustrated in FIG. 30 increases. Accordingly, since a force in which the outer column 7 tightens the inner column 3 disappears, a friction force generated by the sliding of the inner column 3 disappears. As a result, the operator may adjust the telescopic position.

Further, when the distance between the first rotation cam portion 23 and the first fixed cam portion 24 increases, the pressure of squeezing the pressing bracket 42 increases. For this reason, the tilt position of the steering column 14 is fixed by the rotation of the manipulation lever 6. Further, when the manipulation lever 6 is rotated, the squeezing pressure of the column bracket 1 increases, and a friction force generated between the inner column 3 and the outer column 7 increases. Thus, the telescopic position is fixed.

In this way, a tightening force applied to the pressing bracket 42 is loosened in response to the rotation of the manipulation lever 6, and therefore a friction force of the pressing bracket 42 and the outer column 7 disappears or decreases. Accordingly, the tilt position of the outer column 7 is adjusted. Further, when the tightening force applied to the pressing bracket 42 is loosened by the rotation of the manipulation lever 6, the width of the slit 7S of the outer column 7 illustrated in FIG. 30 increases. Accordingly, since a force in which the outer column 7 tightens the inner column 3 disappears, a friction force generated by the sliding of the inner column 3 disappears. Accordingly, the operator may adjust the telescopic position by pressing the inner column 3 through the steering wheel 4 after rotating the manipulation lever 6.

The second tightening mechanism 2 is a cam mechanism and includes the second rotation cam portion 21G of the tilt bolt 21 which rotates along with the manipulation lever 6, a gear lock 27, and a fixed plate portion 28 which is a pressed portion provided in the outer periphery of the inner column 3.

As illustrated in FIG. 28, the gear lock 27 is a lock member, and includes a tooth portion 27G. The fixed plate portion 28 is a gear lock member, and includes a tooth portion 28G provided in the surface thereof. The tooth portion 28G has a concave or convex shape that matches the concave or convex shape and the pitch of the tooth portion 27G. The gear lock 27 is attached to the second rotation cam portion 21G so that the tooth portion 27G faces the tooth portion 28G.

The second rotation cam portion 21G is an eccentric clamp which is eccentric with respect to the axis of the bolt body 21B. When the second rotation cam portion 21G rotates along with the rotation of the manipulation lever 6, it is possible to select a state where the gear lock 27 is pressed against the fixed plate portion 28 as illustrated in FIG. 28 or a state where the gear lock 27 is separated from the fixed plate portion 28 to release the fixing operation as illustrated in FIG. 29. As illustrated in FIG. 28, the gear lock 27 is biased to the fixed plate portion 28 by an axial force generated in the second rotation cam portion 21G, and hence the tooth portion 27G engages with the tooth portion 28G. In this case, the distance between the first rotation cam portion 23 and the first fixed cam portion 24 decreases. For this reason, the second tightening mechanism 2 is biased to the column bracket 1 in the tilt direction, and is reliably fixed to the fixed plate portion 28 in the telescopic direction.

As illustrated in FIG. 29, when the second rotation cam portion 21G rotates along with the rotation of the manipulation lever 6, the gear lock 27 is separated from the fixed plate portion 28 so as to release the fixing operation, and hence a pressing force applied from the gear lock 27 to the fixed plate portion 28 is released. In this case, the distance between the first rotation cam portion 23 and the first fixed cam portion 24 increases. Accordingly, the operator may adjust the tilt position and the telescopic position.

As illustrated in FIG. 30, at least a part of the fixed plate portion 28 is fixed to the inner column 3 which is placed at the position of the slit 7S of the outer column 7. For this reason, the width Δw of the fixed plate portion 28 is smaller than the width ΔS of the slit 7S. Accordingly, the fixed plate portion 28 does not disturb a tightening force applied to the pressing bracket 42.

The fixed plate portion 28 is fixed to the inner column 3 by a separation mechanism 30. The separation mechanism 30 includes a first hole 28h on the fixed plate portion 28, a second hole 3h on the inner column 3, and a shear pin 31. The shear pin 31 is a mechanical fuse which is broken by a shearing force generated in the event of a secondary collision. The separation load in which the shear pin 31 is broken depends on the cross-sectional area of the shear surface and the material of the shear pin 31. The shear pin 31 is located at a position straddling the first hole 28h on the fixed plate portion 28 and the second hole 3h on the inner column 3 in a non-separation state. As illustrated in FIG. 28, the shear pin 31 includes a cylindrical shear pin body, a shear pin head portion 32 which is provided at one end of the shear pin body and has a diameter larger than the diameter of the shear pin body, and a hook portion 34 which is provided at the other end of the shear pin body to position the shear pin at the edge of the second hole 3h. The shear pin body is provided with a bottomed hollow portion 33, and an outward elastic force is applied to the hook portion 34. With such a structure, the separation mechanism 30 fixes the inner column 3 and the fixed plate portion 28 in a detachable state.

In the fifth embodiment, the shear pin 31 has a pin shape. However, the shear pin may be formed through resin injection or the like such that a resin is ejected into the first hole 28h on the fixed plate portion 28 and the second hole 3h on the inner column 3, and then is solidified.

Figure 31:
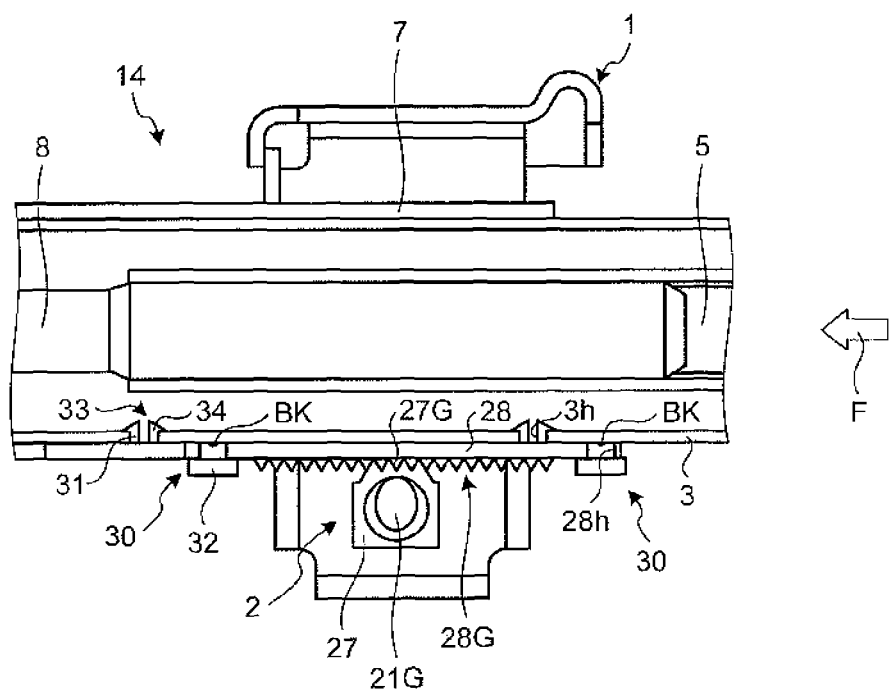
FIG. 31 is a diagram illustrating a state of the second tightening mechanism according to the fifth embodiment in the event of a primary collision.

FIG. 31 is a diagram illustrating a state of the second tightening mechanism according to the fifth embodiment in the event of a primary collision. When an excessive load, which exceeds the load setting value of the secondary collision, is applied to the steering column 14 attached to the vehicle body, to press the steering column 14 by a force F toward the front side of the vehicle body, the shear pin 31 is cut at the cut surface BK. Accordingly, the inner column 3 is inserted into the outer column 7 and accordingly the inner column 3 is accommodated into the outer column 7 while the outer column 7 is fixed to the vehicle body VB.

Figure 32:
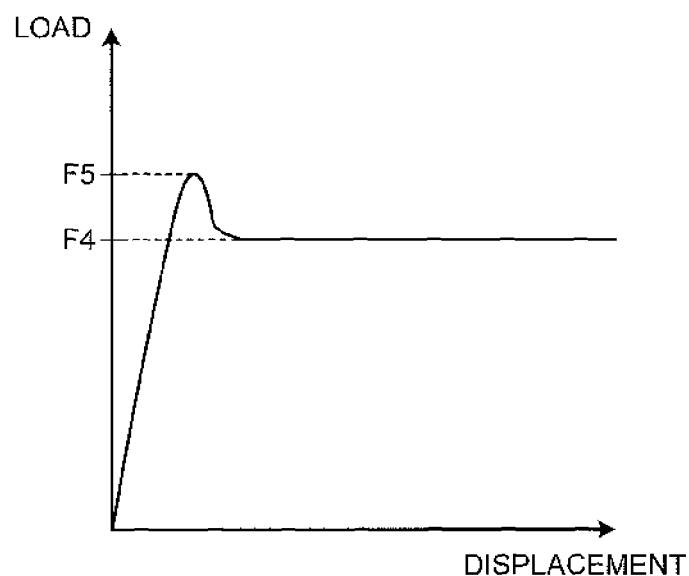
FIG. 32 is a diagram illustrating a load generated in the event of a secondary collision and causing displacement after a primary collision occurs in a steering column of a steering device according to a comparative example.
Figure 33:
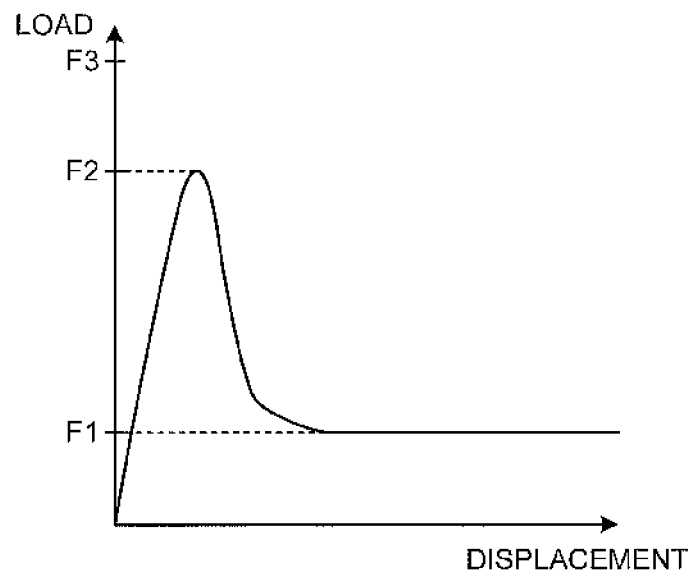
FIG. 33 is a diagram illustrating a load generated in the event of a secondary collision and causing displacement after a primary collision occurs in the steering column of the steering device according to the fifth embodiment.

FIG. 32 is a diagram illustrating a load generated in the event of a secondary collision and causing displacement after a primary collision occurs in a steering column of a steering device according to a comparative example. FIG. 33 is a diagram illustrating a load generated in the event of a secondary collision and causing displacement after a primary collision occurs in the steering column of the steering device according to the fifth embodiment. In FIGS. 32 and 33, the horizontal axis indicates the forward displacement amount of the inner column 3, and the vertical axis indicates the load necessary to move the inner column 3 forward.

The comparative example is an example in the case where the outer column is attached to the vehicle body through the capsule as in the technique disclosed in Prior Art 1. In the comparative example, the outer column is disposed at the rear side in relation to the inner column. Then, when an excessive load is applied to the outer column, the rod contacts the end of the telescopic adjustment hole integrated with the outer column, and then the load is transmitted to the capsule through the bracket. A force F5 illustrated in FIG. 32 indicates the allowable shearing force of the capsule.

In the comparative example, the outer column is supported in the axial direction by a friction force generated between the inner column and the outer column due to the tightening of the bracket. A force F4 illustrated in FIG. 32 indicates the friction force that supports the outer column. The force F4 is smaller than the force F5. In order to prevent the movement of the outer column by the load applied in normal use, the force F4 needs to be maintained at a predetermined value or more.

In the comparative example, when a load of the force F5 or more is applied to the outer column, the capsule is cut and the outer column is separated from the vehicle body. Subsequently, the outer column moves in the axial direction while absorbing a friction force with respect to the inner column. However, since the force F4 is maintained at a predetermined value or more as described above, the outer column moves smoothly, and hence the operator may not be easily protected from the secondary collision.

Meanwhile, in the fifth embodiment, the inner column 3 is supported in the axial direction while being fixed to the outer column 7 by a first friction force, which is generated between the inner column 3 and the outer column 7 by tightening of the column bracket 1 using the first tightening mechanism 20, and a second friction force, which is generated in the second tightening mechanism 2. The force F1 illustrated in FIG. 33 indicates the first friction force, and the force F3 indicates the sum of the first friction force and the second friction force. Further, the force F2 illustrated in FIG. 33 indicates the allowable shearing force of the shear pin 31 of the separation mechanism 30. The force F2 is smaller than the force F3 and is larger than the force F1.

In the fifth embodiment, when a load of the force F2 or more is applied to the inner column 3, the shear pin 31 is cut and the inner column 3 is separated from the column bracket 1 (the fixed plate portion 28). Accordingly, since the connection of the second tightening mechanism 2 is released, the second friction force is not applied to the inner column 3. For this reason, the inner column 3 moves in the axial direction while absorbing an impact by the first friction force after the shear pin 31 of the separation mechanism 30 is cut. In the steering device 100 according to the fifth embodiment, when the first friction force is set to be small, the inner column 3 moves smoothly, and hence the operator may be easily protected from the secondary collision.

In the fifth embodiment, even when the setting value of the first friction force is small, the second friction force may compensate a degree in which the first friction force decreases among the force supporting the inner column 3 in the axial direction. For this reason, since the steering device 100 according to the fifth embodiment adjusts the setting value of the first friction force and the setting value of the second friction force, it is possible to suppress the inner column 3 from moving by the load applied in normal use and to more easily protect the operator from the secondary collision.

As described above, the steering device 100 according to the fifth embodiment includes the cylindrical inner column 3, the cylindrical outer column 7, the column bracket 1, the fixed plate portion 28, the first tightening mechanism 20, the second tightening mechanism 2, and the separation mechanism 30. The inner column 3 rotatably supports the input shaft 5 connected to the steering wheel 4. The outer column 7 is a cylindrical member into which at least a part of the inner column 3 is inserted and includes the slit 7S formed by notching one insertion side end of the inner column 3. The column bracket 1 is fixed to the vehicle body side member 13 and tightens the outer column 7 by the pressing bracket 42 squeezing the outer column 7. The fixed plate portion 28 is provided in the outer periphery of the inner column 3 while at least a part is disposed inside the slit 7S of the outer column 7. The first tightening mechanism 20 tightens the outer column 7 by the pressing bracket 42 in response to the rotation of the manipulation lever 6 so as to increase the first friction force generated between the inner column 3 and the outer column 7. The second tightening mechanism 2 biases the gear lock 27 as the lock member to the fixed plate portion 28 in the tilt direction in response to the rotation of the manipulation lever 6. In a state where the first tightening mechanism 20 tightens the outer column 7 and where the second tightening mechanism 2 biases the gear lock 27 to the fixed plate portion 28 in the tilt direction, the separation mechanism 30 allows the separation of the inner column 3 by changing the relative position with respect to the pressing bracket 42.

With this structure, the outer column 7 is supported by the vehicle body VB through the vehicle body side member 13. Accordingly, when a force is transmitted from the steering wheel 4 to the steering column 14 in the event of a secondary collision, the inner column 3 is inserted into the outer column 7 so as to be accommodated into the outer column 7. In this case, the outer column 7 is fixed to the vehicle body VB. Even when the inner column 3 is inserted into the outer column 7 by an erroneous operation, the steering column does not drop. Even when a squeezing pressure caused by the column bracket 1 is decreased so as to decrease a friction force generated between the inner column 3 and the outer column 7, the second tightening mechanism 2 biases the gear lock 27 to the fixed plate portion 28 in the tilt direction. Accordingly, the possibility that a load caused by a factor other than a secondary collision exceeds the separation load decreases. For this reason, in order to reduce an impact of the secondary collision for the operator having a light weight, the setting value of the separation load in which the steering wheel 4 (the inner column 3) moves toward the front side of the vehicle body may be decreased.

When the weight of the operator is light, since the setting value of the separation load, in which the inner column 3 of the steering column 14 moves toward the front side of the vehicle body, may be reduced, a squeezing pressure caused by the column bracket 1 is decreased so as to decrease a friction force generated between the inner column 3 and the outer column 7. The fixed plate portion 28 is disposed so that at least a part is disposed inside the slit 7S of the outer column 7, and is detachably fixed to the inner column 3. For this reason, when a collision (a primary collision) occurs in the vehicle body VB, the inner column 3 is separated from the column bracket 1 (the fixed plate portion 28), and hence the connection of the second tightening mechanism 2 is released. Accordingly, the second friction force is not applied to the inner column 3. For this reason, the inner column 3 moves in the axial direction while absorbing an impact by the first friction force after the shear pin 31 of the separation mechanism 30 is cut. As a result, the steering device 100 may reduce an impact (a secondary collision) for the operator having a light weight.

In the separation mechanism 30, the fixed plate portion 28 is provided with the first hole 28h, and the shear pin 31 is provided so as to straddle the first hole 28h and the second hole 3h opened in the inner column 3. In a case of a primary collision, when a load is applied to the steering column 14, attached to the vehicle body VB, and the steering column 14 is pressed toward the front side of the vehicle body, a shearing force is applied to the shear pin 31. When the shear pin 31 is broken, the connection between the fixed plate portion 28 and the inner column 3 is released, and hence the connection of the second tightening mechanism 2 is released. For this reason, a force in which the second tightening mechanism 2 biases the gear lock 27 to the fixed plate portion 28 in the tilt direction is not transmitted, and hence the second friction force is not exerted.

The tilt bolt 21 penetrates the pressing bracket 42 and rotates along with the manipulation lever 6. The second rotation cam portion 21G is provided at a position facing the slit 7S of the outer column 7 and rotates along with the tilt bolt 21. With this structure, the operation of the first tightening mechanism 20 may be interlocked with the operation of the second tightening mechanism 2. Then, the operator may adjust the tilt position and the telescopic position by releasing the fixing operations of both the first tightening mechanism 20 and the second tightening mechanism 2 only by the manipulation of the manipulation lever 6. Further, the operator may fix the tilt position and the telescopic position by fixing both the first tightening mechanism 20 and the second tightening mechanism 2 only by the manipulation of the manipulation lever 6.

Then, the gear lock 27 as the lock member changes the relative position thereof in the tilt direction with respect to the fixed plate portion 28, in response to the rotation of the second rotation cam portion 21G. For this reason, the operator may adjust the tilt position and the telescopic position by releasing the fixing operation of the second tightening mechanism 2 only by the manipulation of the manipulation lever 6. Further, the operator may fix the tilt position and the telescopic position by fixing the second tightening mechanism 2 only by the manipulation of the manipulation lever 6.

The gear lock 27 as the lock member includes the tooth portion 27G in a portion contacting the fixed plate portion 28. Accordingly, the second tightening mechanism 2 is biased to the column bracket 1 in the tilt direction, and is reliably fixed to the fixed plate portion 28 in the telescopic direction.

The fixed plate portion 28 includes the tooth portion 28G formed on the surface thereof. Accordingly, the second tightening mechanism 2 is reliably fixed to the fixed plate portion 28 in the telescopic direction.

In the steering device 100 according to the fifth embodiment, the outer column 7 is located at the front side of the vehicle body, includes the pivot bracket 12, and is formed so that the separated inner column 3 is inserted thereinto. With this structure, even when the inner column 3 is inserted into the outer column 7 by an erroneous operation, the steering column 14 does not drop.

Modified Example of Fifth Embodiment

Figure 34:
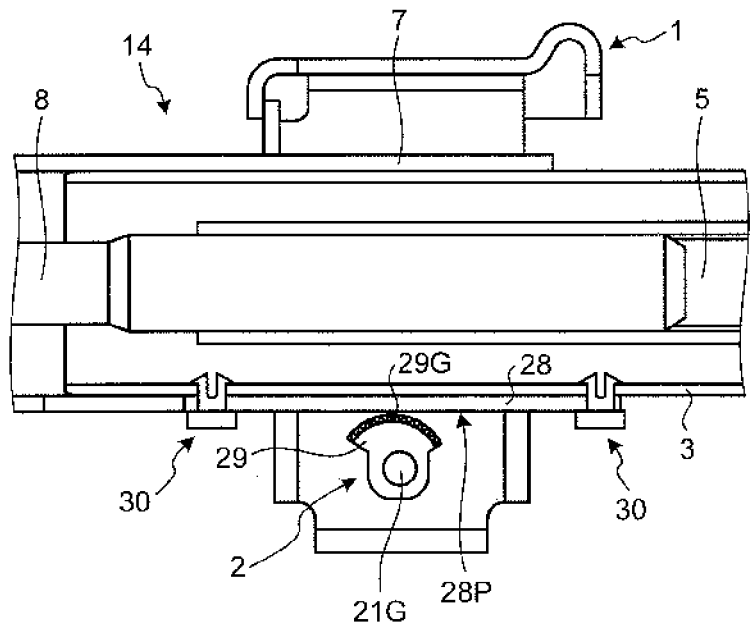
FIG. 34 is a diagram illustrating a state where a second tightening mechanism according to the modified example of the fifth embodiment is fixed.

FIG. 34 is a diagram illustrating a state where a second tightening mechanism according to a modified example of the fifth embodiment is fixed. In addition, the same reference signs will be given to the same components as those of the above-described embodiments, and the repetitive description thereof will not be presented.

The second tightening mechanism 2 according to the modified example of the fifth embodiment relates to a cam mechanism which includes the second rotation cam portion 21G of the tilt bolt 21 which rotates along with the manipulation lever 6, an eccentric cam 29, and the fixed plate portion 28 which is attached to the inner column 3.

As illustrated in FIG. 34, the eccentric cam 29 is a lock member and includes a slide-contact portion 29G. The eccentric cam 29 is fixed to the second rotation cam portion 21G by press-inserting or the like, and rotates along with the rotation of the second rotation cam portion 21G. The surface of the slide-contact portion 29G is subjected to a slip preventing process such as knurling, gear cutting, and uneven cutting. The fixed plate portion 28 is a flat plate member having a smooth surface 28P, and has a flat surface. The surface of the fixed plate portion 28 may be subjected to knurling, gear cutting, and uneven cutting.

The second rotation cam portion 21G may have the same diameter with respect to the axis of the bolt body 21B or may be an eccentric clamp bolt. When the second rotation cam portion 21G rotates along with the rotation of the manipulation lever 6, it is possible to select a state where the slide-contact portion 29G of the eccentric cam 29 illustrated in FIG. 34 is pressed against the fixed plate portion 28 or a state where the slide-contact portion 29G of the eccentric cam 29 is separated from the fixed plate portion 28 so as to release the fixing operation. As illustrated in FIG. 34, the slide-contact portion 29G is biased to the fixed plate portion 28 by an axial force generated in the eccentric cam 29. In this case, the distance between the first rotation cam portion 23 and the first fixed cam portion 24 decreases. For this reason, the second tightening mechanism 2 is biased to the column bracket 1 in the tilt direction, and is reliably fixed to the fixed plate portion 28 in the telescopic direction.

As illustrated in FIG. 34, when the second rotation cam portion 21G rotates along with the rotation of the manipulation lever 6, the slide-contact portion 29G is separated from the fixed plate portion 28 so as to release the fixing operation, and hence the pressing force applied from the eccentric cam 29 to the fixed plate portion 28 is released. In this case, the distance between the first rotation cam portion 23 and the first fixed cam portion 24 increases. Accordingly, the operator may adjust the tilt position and the telescopic position.

The eccentric cam 29 as the lock member includes the slide-contact portion 29G in a portion contacting the fixed plate portion 28. Accordingly, the second tightening mechanism 2 is biased to the column bracket 1 in the tilt direction, and is reliably fixed to the fixed plate portion 28 in the telescopic direction. The second tightening mechanism 2 biases the eccentric cam 29 as the lock member to the fixed plate portion 28 in the tilt direction in response to the rotation of the manipulation lever 6. For this reason, the eccentric cam 29 is reliably fixed to the fixed plate portion 28 in the telescopic direction even when the fixed plate portion 28 is a plate-shaped member having the smooth surface 28P.

Sixth Embodiment

Figure 35:
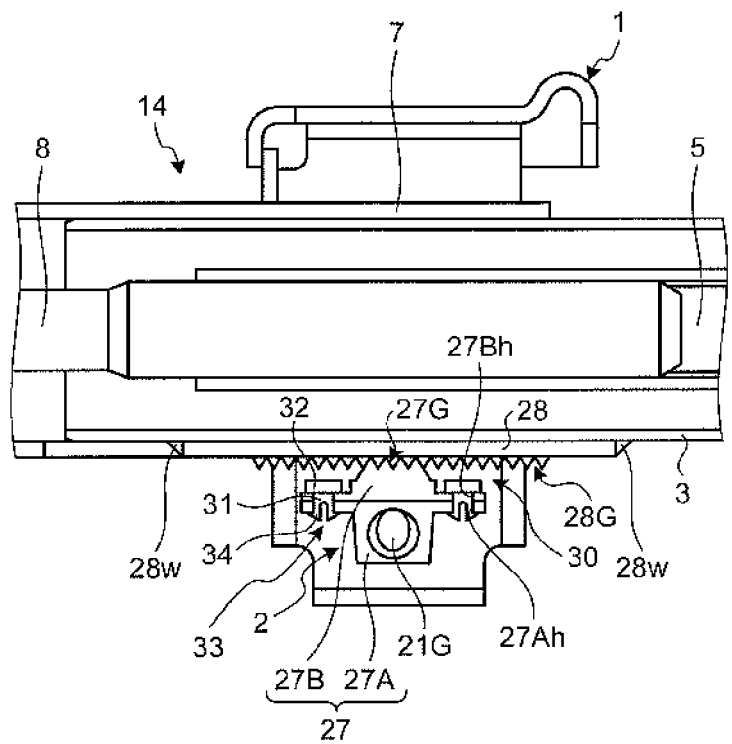
FIG. 35 is a diagram illustrating a state where a second tightening mechanism according to a sixth embodiment is fixed.
Figure 36:
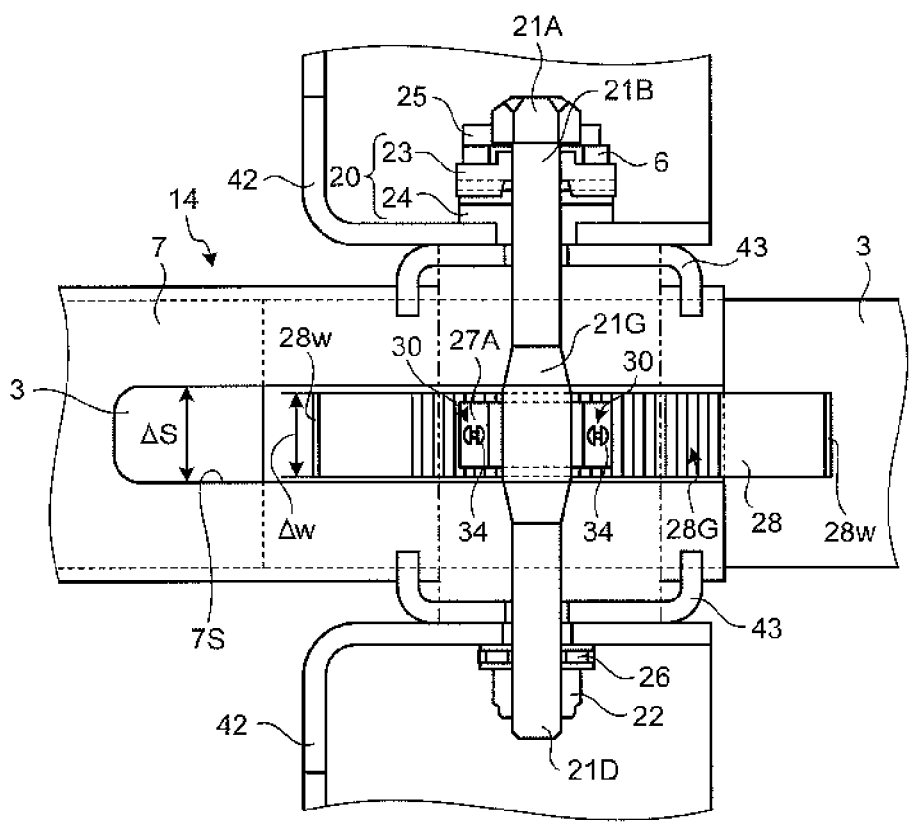
FIG. 36 is a top view illustrating the second tightening mechanism according to the sixth embodiment when viewed from the downside in the tilt direction.
Figure 37:
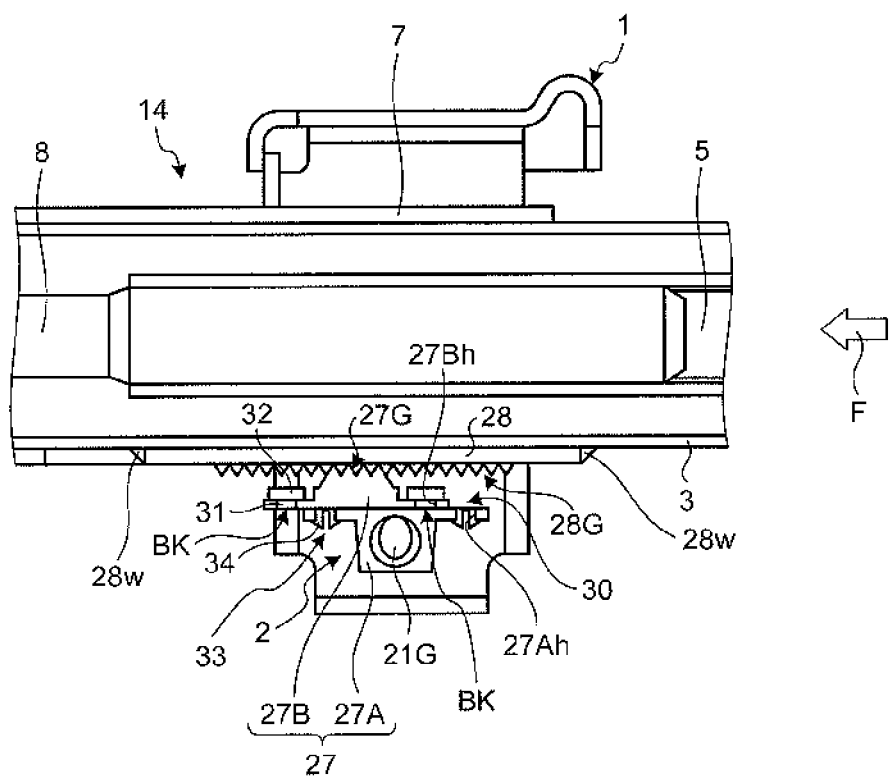
FIG. 37 is a diagram illustrating a state of the second tightening mechanism according to the sixth embodiment in the event of a primary collision.

FIG. 35 is a diagram illustrating a state where a second tightening mechanism according to a sixth embodiment is fixed. FIG. 36 is a top view illustrating the second tightening mechanism according to the sixth embodiment when viewed from the downside in the tilt direction. FIG. 37 is a diagram illustrating a state of the second tightening mechanism according to the sixth embodiment in the event of a primary collision. In addition, the same reference signs will be given to the same components as those of the above-described fifth embodiment, and the repetitive description thereof will not be presented. The steering device of the sixth embodiment is different from the steering device of the fifth embodiment in that the lock member includes a first lock member 27B and a second lock member 27A which are divided in the tilt direction. Then, with respect to the second lock member 27 A contacting the fixed plate portion 28 as the pressed portion, the separation mechanism 30 detachably fixes the second lock member 27A. Hereinafter, the steering device of the sixth embodiment will be described in more detail with reference to FIGS. 35 to 37.

As illustrated in FIG. 35, the gear lock 27 is a lock member, and includes the first lock member 27B and the second lock member 27A. The first lock member 27B includes the tooth portion 27G contacting the fixed plate portion 28. The fixed plate portion 28 is a pressed portion of which the surface is provided with the tooth portion 28G. The tooth portion 28G has a concave or convex shape that matches the concave or convex shape and the pitch of the tooth portion 27G. The gear lock 27 is attached to the second rotation cam portion 21G so that the tooth portion 27G faces the tooth portion 28G.

The first lock member 27B and the second lock member 27A are fixed by the separation mechanism 30. It is desirable that the facing surfaces of the first lock member 27B and the second lock member 27A be smoothly flat. The separation mechanism 30 includes a first hole 27Bh of the first lock member 27B, a second hole 27Ah of the second lock member 27A, and the shear pin 31. The shear pin 31 is a mechanical fuse which is broken by a shearing force generated in the event of a secondary collision. A separation load that causes the breakage of the shear pin 31 depends on the cross-sectional area of the shear surface and the material of the shear pin 31. The shear pin 31 is located at a position straddling the first hole 27Bh of the first lock member 27B and the second hole 27Ah of the second lock member 27A in a non-separation state. As illustrated in FIG. 35, the shear pin 31 includes a cylindrical shear pin body, a shear pin head portion 32 which is provided at one end of the shear pin body and has a diameter larger than the diameter of the shear pin body, and a hook portion 34 which is provided at the other end of the shear pin body and is positioned to the edge of the second hole 27Ah. The shear pin body is provided with a bottomed hollow portion 33, and an outward elastic force is applied to the hook portion 34.

In the sixth embodiment, the shear pin 31 has a pin shape, but may be a shear pin which is formed through resin injection or the like such that a resin is injected into the first hole 27Bh of the first lock member 27B and the second hole 27Ah of the second lock member 27A, and then solidified.

As described above, the second rotation cam portion 21G is an eccentric clamp which is eccentric with respect to the axis of the bolt body 21B. When the second rotation cam portion 21G rotates along with the rotation of the manipulation lever 6, it is possible to select a state where the first lock member 27B is pressed against the fixed plate portion 28 through the second lock member 27A or a state where the first lock member 27B is separated from the fixed plate portion 28 through the second lock member 27A so as to release the fixing operation. In this way, the second lock member 27A is biased to the fixed plate portion 28 by an axial force generated in the second rotation cam portion 21G, and the tooth portion 27G of the first lock member 27B engages with the tooth portion 28G along with the second lock member 27A. In this case, the distance between the first rotation cam portion 23 and the first fixed cam portion 24 decreases. For this reason, the second tightening mechanism 2 is biased to the column bracket 1 in the tilt direction, and is reliably fixed to the fixed plate portion 28 in the telescopic direction.

Further, when the second rotation cam portion 21G rotates along with the rotation of the manipulation lever 6, the first lock member 27B is separated from the fixed plate portion 28 through the second lock member 27A so as to release the fixing operation, and hence a pressing force applied from the gear lock 27 to the fixed plate portion 28 is released. In this case, the distance between the first rotation cam portion 23 and the first fixed cam portion 24 increases. Accordingly, the operator may adjust the tilt position and the telescopic position.

As illustrated in FIG. 36, at least a part of the fixed plate portion 28 is fixed to the inner column 3 at the position of the slit 7S of the outer column 7. The inner column 3 and the fixed plate portion 28 may be fixed by a bolt or the like, but may be fixed at a welding position 28w illustrated in FIG. 36 by welding. Further, the width Δw of the fixed plate portion 28 is smaller than the width ΔS of the slit 7S. Accordingly, the fixed plate portion 28 does not disturb a tightening force applied to the pressing bracket 42. The pressed portion of the sixth embodiment is the fixed plate portion 28, but the invention is not limited thereto. For example, the pressed portion may be obtained by directly forming the shape of the tooth portion 28G on the outer periphery surface of the inner column 3.

As illustrated in FIG. 37, when an excessive load exceeding the load setting value of the secondary collision is applied to the steering column 14, attached to the vehicle body VB, so that the steering column 14 is pressed by the force F exerted toward the front side of the vehicle body, the shear pin 31 is cut at the cut surface BK. Accordingly, the inner column 3 is inserted into the outer column 7 so as to be accommodated into the outer column 7 while the outer column 7 is fixed to the vehicle body VB.

As described above, the steering device 100 according to the sixth embodiment includes the cylindrical inner column 3, the cylindrical outer column 7, the column bracket 1, the fixed plate portion 28, the first tightening mechanism 20, the second tightening mechanism 2, and the separation mechanism 30. The inner column 3 rotatably supports the input shaft 5 connected to the steering wheel 4. The outer column 7 is a cylindrical member into which at least a part of the inner column 3 is inserted and includes the slit 7S formed by notching one insertion side end of the inner column 3. The column bracket 1 is fixed to the vehicle body side member 13 and tightens the outer column 7 by the pressing bracket 42 squeezing the outer column 7. The fixed plate portion 28 is provided in the outer periphery of the inner column 3 while at least a part is disposed inside the slit 7S of the outer column 7. The first tightening mechanism 20 tightens the outer column 7 by the pressing bracket 42 in response to the rotation of the manipulation lever 6 so as to increase the first friction force generated between the inner column 3 and the outer column 7. The second tightening mechanism 2 biases the gear lock 27 as the lock member to the fixed plate portion 28 in the tilt direction in response to the rotation of the manipulation lever 6. In a state where the first tightening mechanism 20 tightens the outer column 7 and the second tightening mechanism 2 biases the gear lock 27 to the fixed plate portion 28 in the tilt direction, the separation mechanism 30 causes the inner column 3 to be detachable from the pressing bracket 42 by changing the relative position thereof, by allowing the second lock member 27A to be detachable from the first lock member 27B contacting the fixed plate portion 28.

With this structure, the outer column 7 is supported by the vehicle body VB through the vehicle body side member 13. Accordingly, when a force is transmitted from the steering wheel 4 to the steering column 14 in the event of a secondary collision, the inner column 3 is inserted into the outer column 7 so as to be accommodated into the outer column 7. In this case, the outer column 7 is fixed to the vehicle body VB. Even when the inner column 3 is inserted into the outer column 7 by an erroneous operation, the steering column 14 does not drop. Even when a squeezing pressure caused by the column bracket 1 is decreased so as to decrease a friction force generated between the inner column 3 and the outer column 7, the second tightening mechanism 2 biases the gear lock 27 to the fixed plate portion 28 in the tilt direction. Accordingly, the possibility that a load caused by a factor other than a secondary collision exceeds the separation load decreases. For this reason, in order to reduce an impact of the secondary collision for the operator having a light weight, the setting value of the separation load in which the steering wheel 4 (the inner column 3) moves toward the front side of the vehicle body may be decreased.

When the weight of the operator is light, since the setting value of the separation load in which the inner column 3 of the steering column 14 moves toward the front side of the vehicle body is decreased, a squeezing pressure caused by the column bracket 1 is decreased so as to decrease a friction force generated between the inner column 3 and the outer column 7. When a collision (a primary collision) occurs in the vehicle body VB, the shear pin 31 of the separation mechanism 30 is sheared by the impact load. As a result, a force of fixing the first lock member 27B and the second lock member 27A using the separation mechanism 30 disappears, and hence a deviation may occur in the facing surfaces of the first lock member 27B and the second lock member 27A. For this reason, when a collision (a primary collision) occurs in the vehicle body VB, the inner column 3 is separated from the column bracket 1 (the fixed plate portion 28) along with the first lock member 27B, and the connection of the second tightening mechanism 2 is released. Accordingly, the second friction force is not applied to the inner column 3. For this reason, the inner column 3 moves in the axial direction while absorbing an impact by the first friction force after the shear pin 31 of the separation mechanism 30 is cut. As a result, the steering device 100 may reduce an impact (a secondary collision) for the operator having a light weight.

The steering device according to the fifth embodiment and the sixth embodiment may be also applied to a steering device including an electric motor.

REFERENCE SIGNS LIST

1 COLUMN BRACKET
2 SECOND TIGHTENING MECHANISM
3 INNER COLUMN
3h SECOND HOLE
4 STEERING WHEEL
5 INPUT SHAFT
6 MANIPULATION LEVER
7 OUTER COLUMN
7S SLIT
8 OUTPUT SHAFT
9 UNIVERSAL JOINT
10 LOWER SHAFT
11 UNIVERSAL JOINT
12 PIVOT BRACKET
13 VEHICLE BODY SIDE MEMBER
14 STEERING COLUMN
15 STEERING SHAFT
20 FIRST TIGHTENING MECHANISM
21 TILT BOLT
21A TILT BOLT HEAD PORTION
21B BOLT BODY
21D SCREW PORTION
21G SECOND ROTATION CAM PORTION
22 CAULKING NUT
23 FIRST ROTATION CAM PORTION
24 FIRST FIXED CAM PORTION
25 SPIN STOPPER
26 THRUST BEARING
27 GEAR LOCK
27A SECOND LOCK MEMBER
27B FIRST LOCK MEMBER
27G TOOTH PORTION
28 FIXED PLATE PORTION
28h FIRST HOLE
28G TOOTH PORTION
29 ECCENTRIC CAM
29G SLIDE-CONTACT PORTION
30 SEPARATION MECHANISM
31 SHEAR PIN
32 SHEAR PIN HEAD PORTION
33 HOLLOW PORTION
34 HOOK PORTION
41 ATTACHMENT PLATE PORTION
42 PRESSING BRACKET
43 DISTANCE BRACKET
44 POSITIONING PORTION
45 FIXED POSITION
100 STEERING DEVICE
101 STEERING HANDLE
102 RACK HOUSING
103 PINION
104 TIE ROD
105 FEMALE STEERING SHAFT
106 MALE STEERING SHAFT
107 CROSS JOINT
108 INTERMEDIATE SHAFT
109 CROSS JOINT
110 STEERING DEVICE
120 STEERING COLUMN APPARATUS
121 INNER COLUMN
122 OUTER COLUMN
123 TILT BRACKET
1231 VEHICLE BODY MOUNTING SIDE BRACKET
1232 PRESSING BRACKET
124 FIXED BRACKET
125 TELESCOPIC MULTI-PLATE
126 TELESCOPIC MULTI-PLATE
127 TILT LEVER
128 TILT BOLT HOLE
129 TIGHTENING MECHANISM
130 MANIPULATION PORTION
131 ROLLING BEARING
132 TILT BOLT
133 CAM LOCK MECHANISM
134 NUT
135 ROLLING BEARING
136 SEPARATION PREVENTING MECHANISM
137 SHEAR PIN
138 SHEAR PIN
139 INNER COLUMN CONTACT SURFACE
140 SHEAR PIN HOLE
141 SHEAR PIN HOLE
142 FIXED PORTION

143 FIXED PORTION
144 TRANSVERSE BEAM PORTION
145 COLUMN PORTION
146 MOUNTING PORTION
147 DISTANCE BRACKET
148 CAM AND GEAR MECHANISM
149 SHEAR PIN
150 SHEAR PIN
151 MOVABLE GEAR LOCK
152 FIXED GEAR LOCK
153 TILT BOLT CENTER PORTION
154 CAM MECHANISM
155 ECCENTRIC CAM
156 PRESSING BLOCK
157 PRESSING BLOCK
158 INNER PLATE
159 CONCAVE PORTION
160 FITTING PROTRUSION
161 FITTING HOLE
162 INJECTION PORT
RP RACK AND PINION
PV ROTATION SHAFT
SE POWER TRANSMISSION MECHANISM
VB VEHICLE BODY

The invention claimed is:

1. A steering device comprising:
an inner column having a cylindrical shape and rotatably supporting an input shaft connected to a steering wheel;
an outer column having a cylindrical shape into which at least a part of the inner column is inserted, and having a slit formed by notching one end thereof at which the inner column is inserted;
a column bracket fixed to a vehicle body side member and tightening the outer column by a pressing bracket squeezing the outer column;
a pressed portion provided on the outer periphery of the inner column;
a first tightening mechanism tightening the outer column in response to a rotation of a manipulation lever;
a second tightening mechanism biasing a lock member to the pressed portion in a tilt direction in response to the rotation of the manipulation lever; and
a separation mechanism causing the inner column to be detachable when the inner column changes a relative position with respect to the pressing bracket, in a state where the first tightening mechanism tightens the outer column and the second tightening mechanism biases the lock member to the pressed portion in the tilt direction.

2. The steering device according to claim 1,
wherein the pressed portion is a fixed plate portion which is detachably fixed to the inner column, and at least a part of the pressed portion is disposed inside the slit of the outer column.

3. The steering device according to claim 2,
wherein the separation mechanism includes a first hole on the fixed plate portion, a second hole on the inner column, and a shear pin provided so as to straddle the first hole and the second hole, and detachably fixes the inner column and the fixed plate portion.

4. The steering device according to claim 1, further comprising:
a tilt bolt that penetrates the pressing bracket and is interlocked with the manipulation lever,
wherein the second tightening mechanism includes a rotation cam portion that is provided at a position facing the slit of the outer column and rotates along with the tilt bolt.

5. The steering device according to claim 4,
wherein a relative position of the lock member in the tilt direction with respect to a fixed plate portion changes in response to the rotation of the rotation cam portion.

6. The steering device according to claim 1,
wherein the lock member includes a tooth portion or uneven portion in a portion contacting a fixed plate portion.

7. The steering device according to claim 1,
wherein the lock member includes a first lock member and a second lock member that are divided in the tilt direction, and
wherein the separation mechanism detachably fixes the second lock member to the first lock member contacting the pressed portion.

8. The steering device according to claim 7,
wherein the separation mechanism includes a first hole on the first lock member, a second hole on the second lock member, and a shear pin provided so as to straddle the first hole and the second hole, and detachably fixes the first lock member and the second lock member.

9. The steering device according to claim 7, further comprising:
a tilt bolt that penetrates the pressing bracket and is interlocked with the manipulation lever,
wherein the second tightening mechanism includes a rotation cam portion that is provided at a position facing the slit of the outer column and rotates along with the tilt bolt, and
a relative position of the second lock member in the tilt direction with respect to a fixed plate portion changes in response to the rotation of the rotation cam portion.

10. The steering device according to claim 7,
wherein the first lock member includes a tooth portion or a concave or convex shape in a portion contacting the pressed portion.

11. The steering device according to claim 4,
wherein the rotation cam portion is eccentric with respect to the axis of the tilt bolt.

12. The steering device according to claim 1,
wherein the outer column is located at the front side of the vehicle body, includes a pivot bracket, and is constituted so that the separated inner column is inserted thereinto.

* * * * *